(12) United States Patent
Tsukada et al.

(10) Patent No.: US 6,338,285 B2
(45) Date of Patent: Jan. 15, 2002

(54) FEED SCREW DEVICE

(75) Inventors: Toru Tsukada; Soichiro Kato, both of Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 08/877,518

(22) Filed: Jun. 17, 1997

(30) Foreign Application Priority Data

Jun. 17, 1996 (JP) .............................. 8-155545
Jun. 17, 1996 (JP) .............................. 8-155546
Jul. 18, 1996 (JP) .............................. 8-189148

(51) Int. Cl.$^7$ .............................................. F16H 55/02
(52) U.S. Cl. .................................. 74/89.44; 74/424.71
(58) Field of Search ........................... 74/459, 424.8 R, 74/89.44, 424.71; 277/354, 938, 936, 946, 551

(56) References Cited

U.S. PATENT DOCUMENTS

| | | | | |
|---|---|---|---|---|
| 3,116,931 A | * | 1/1964 | Edwards et al. ............... 74/459 |
| 3,277,736 A | * | 10/1966 | Goodman ..................... 74/459 |
| 3,588,125 A | * | 6/1971 | Mastromatteo ............. 277/26 |
| 3,917,288 A | * | 11/1975 | Huber et al. .................. 277/59 |
| 4,053,167 A | * | 10/1977 | Jelinek ........................ 74/459 |
| 4,150,835 A | * | 4/1979 | Wheelock ................... 74/459 |
| 4,165,079 A | * | 8/1979 | Clements .................... 277/9.5 |
| 4,239,632 A | | 12/1980 | Baile ........................... 252/12 |
| 4,407,511 A | * | 10/1983 | Benton et al. ................ 74/459 |
| 4,493,373 A | * | 1/1985 | Jackson ....................... 277/165 |
| 4,516,785 A | * | 5/1985 | Miller et al. ............. 277/188 A |
| 4,635,948 A | * | 1/1987 | Zerfass et al. .......... 277/235 B |
| 4,905,533 A | * | 3/1990 | Benton et al. ................ 74/459 |
| 5,188,374 A | * | 2/1993 | Gorman ....................... 277/35 |
| 5,303,936 A | * | 4/1994 | Kuroki ........................ 277/938 |
| 5,328,177 A | * | 7/1994 | Lair et al. ..................... 277/1 |
| 5,401,574 A | * | 3/1995 | Masutani et al. ............ 277/938 |
| 5,555,771 A | * | 9/1996 | Kuroiwa et al. .............. 74/459 |
| 5,582,072 A | * | 12/1996 | Yamaguchi et al. .......... 74/459 |
| 5,695,197 A | * | 12/1997 | Farley et al. ................ 277/938 |
| 5,992,857 A | * | 11/1999 | Ueda et al. .................. 277/592 |

FOREIGN PATENT DOCUMENTS

| | | | | |
|---|---|---|---|---|
| JP | 63-23239 | 5/1988 | ........ C10M/169/06 |
| JP | 6-47762 | 6/1994 | ........... F16H/25/24 |
| JP | 7-4952 | 1/1995 | ........... F16H/25/24 |

* cited by examiner

Primary Examiner—David A. Bucci
Assistant Examiner—Chong H. Kim
(74) Attorney, Agent, or Firm—Sughrue Mion, PLLC

(57) ABSTRACT

A ring-like lubricant supply device 6 is fitted into a recess 4 of a nut member 2. The lubricant supply device 6 contains a lubricant and is formed in an outer peripheral surface with notches 7. Tubular members 8 each having an outer diameter larger than the diameter of the notch 7 are inserted into the notches, pushing and widening the notches 7 in a circumferential direction. One end of the tubular member 8 is fitted into a recess 9b of a retaining ring 9 and the retaining ring 9 is fixed to a nut member 2.

17 Claims, 26 Drawing Sheets

*FIG. 7 (a)*          *FIG. 7 (b)*
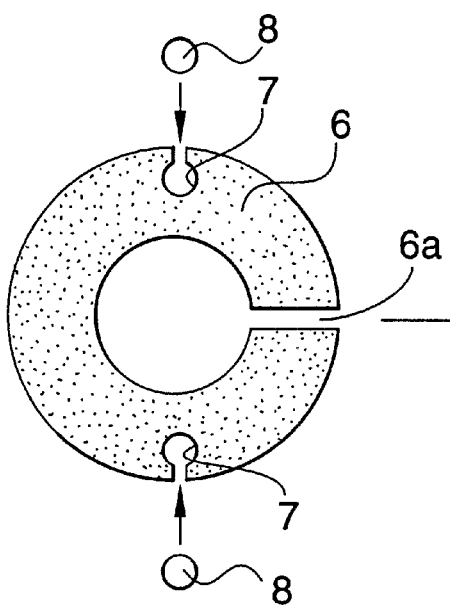
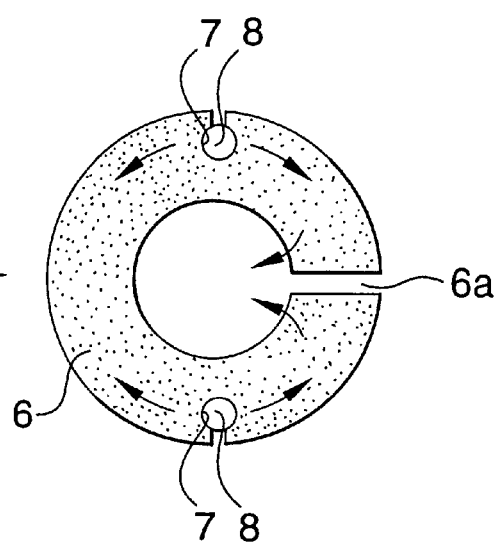

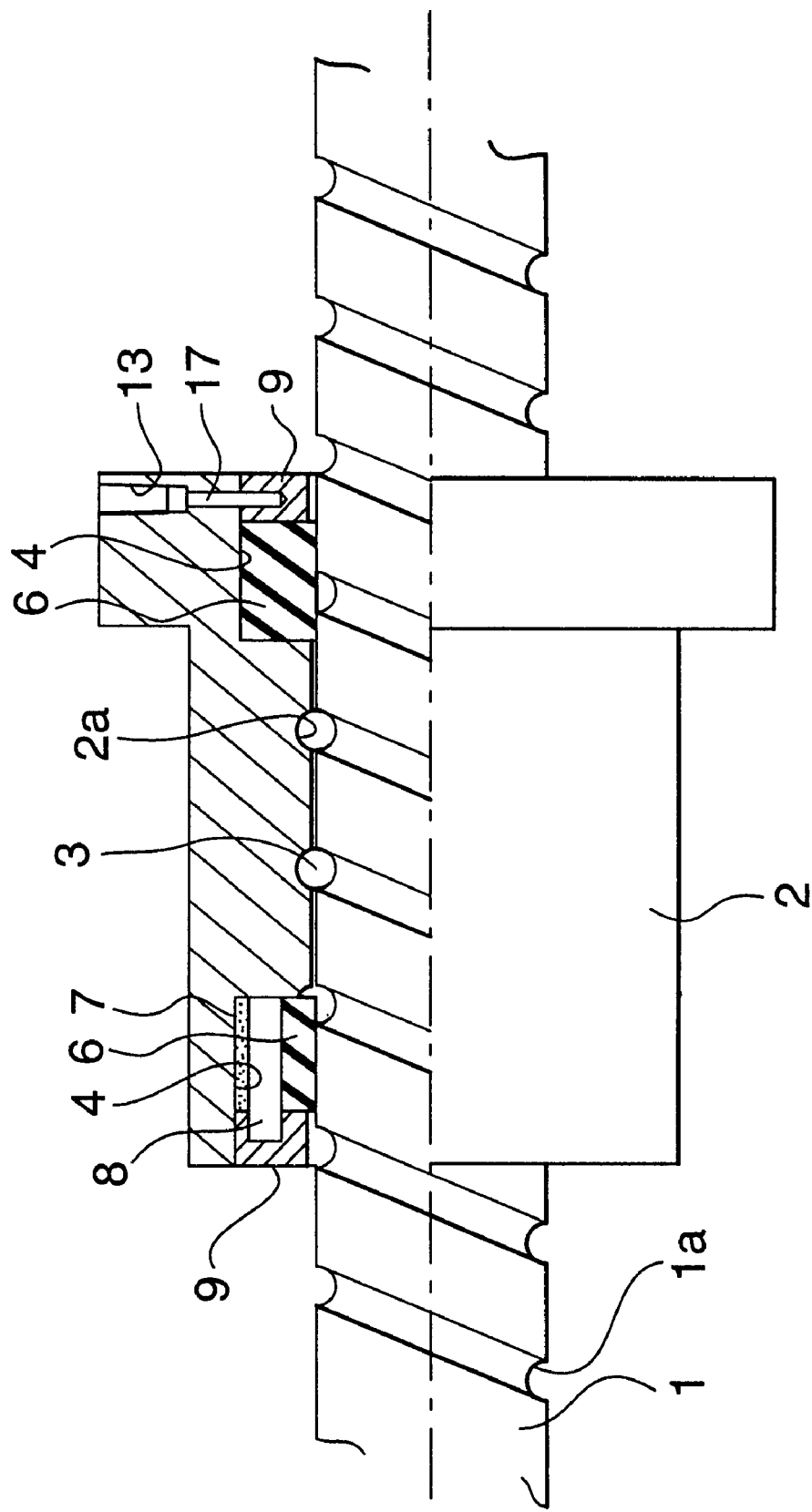

FEED SCREW DEVICE

BACKGROUND OF THE INVENTION

This invention relates to a feed screw device of a ball screw, square thread, etc. Particularly, the invention relates to a feed screw device that can automatically supply a lubricant over a long term.

A conventional ball screw, a kind of feed screw device, is described in Japanese Utility Model Unexamined Publication Nos. Hei 7-4952 and 6-47762, etc., for example.

This kind of ball screw comprises a spiral thread groove 50a made in the outer peripheral surface of a screw shaft 50 threadably engaging a spiral thread groove 51a made in the inner peripheral surface of a nut member 51 via a plurality of balls 52, as shown in FIG. 1, for converting relative rotation of the screw shaft 50 to the nut member 51 into relative displacement in an axial direction of the nut member 51 via the balls 52.

An annular recess 53 is formed in both end parts of the inner diameter face of the nut member 51 (in FIG. 1, only the right end is shown), and a sealing member 54 is mounted on the recess 53.

The sealing member 54 is made from plastic containing a lubricant into a ring shape, and a projection 54a that can be fitted into the thread groove 50a of the screw shaft 50 projects from the inner peripheral surface of the sealing member.

A ring-like garter spring 55 is inserted in the circumferential direction between the outer peripheral surface of the sealing member 54 and the recess 53 of the nut member 51. The garter spring 55 clamps down all the outer peripheral surface of the sealing member 54 toward the outer peripheral surface of the screw shaft 50, that is, the sealing member 54 is pressed in the inner diameter direction.

Further, a tapped hole 56 radially penetrating the circumferential wall of the nut member 51 is made in the position of the recess 53 in the nut member 51 and a set screw 57 is fitted into the tapped hole 56, thereby fixing the sealing member 54 to the nut member 51.

The garter spring 55 sets the gap between the inner peripheral surface of the sealing member 54 and the outer peripheral surface of the screw shaft 50 to zero or less for preventing the lubricant filled in the ball screw from leaking to the outside and a foreign material from entering the ball screw from the outside.

Further, the lubricant exuding from the sealing member 54 decreases frictional resistance of the slide portion between the inner peripheral surface of the sealing member 54 and the outer peripheral surface of the screw shaft 50, namely, slide torque and at the same time, is supplied to the thread groove 50a of the screw shaft 50, the balls 52, and the thread groove 51a of the nut member 51.

However, for the conventional feed screw device of the structure as described above, the garter spring 55 needs to be inserted between the outer periphery of the sealing member 54 and the recess 53 of the screw shaft 50 so that a dimension error of the sealing member 54 is absorbed and that the inner peripheral surface of the sealing member 54 comes in sliding contact with the outer peripheral surface of the screw shaft 50; it is feared that the outer diameter of the feed screw device may grow as large as the garter spring.

In the conventional structure, the sealing member 54 is pressed diametrically, so that it is abutted against the outer peripheral surface of the screw shaft 50, thus the spring needs to be disposed on all the outer periphery of the sealing member 54 in the circumferential direction.

The inner diameter portion on the opposite side (portion not pressed by the garter sprint) to the side pressed by the garter spring 55 of the sealing member 54 in the axial direction apts to float-up with respect to the outer peripheral surface of the screw shaft and it is feared that a sufficient lubricant will not be supplied from the portion.

Some conventional feed screw devices comprise a spring inserted between the tip of the set screw 57 and the sealing member 54 in place of the garter spring 55. However, the lubricant supply section is also pressed only diametrically, thus it is feared that the inner peripheral surface of the sealing member 54 may be placed out of contact with the outer peripheral surface of the screw shaft 50 or that the portion pressed by the set screw in sliding contact with the screw shaft may be worn on one side in portions shifted 90 degrees from the placement position of the set screw 57, etc., for example.

Even if hardware for suppressing jump out of the sealing member 54 from the recess 53 is attached to the nut member 51, the tapped hole 56 needs to be made in the nut member 51 and fixed by the set screw 57 to prevent accompanying rotation of the screw shaft 50 of the sealing member 54 in addition to the hardware; workability is poor.

Further, when the sealing member 54 has a part cut (for example, the sealing member 54 is made into c-shaped) because of attachment thereof, the inner peripheral surface of the sealing member 54 does not come in sufficient contact with the screw shaft 50 and it is feared that a sufficient lubricant will not be supplied from the sealing member 54 depending on the operating condition.

Known as another ball screw, a kind of conventional feed screw device, is a device wherein a space 204 between a screw shaft 201 and a ball screw nut 202 threadably engaged into the screw shaft 201 via a large number of balls 203 is filled with grease or lubricant, as shown in FIG. 2. The ball screw is of seal type wherein an annular recess 205 is made in an end of the ball screw nut 202 and a sealing member 206 is fitted into the annular recess 205 to prevent powder dust, etc., from entering into the ball screw nut 202.

By the way, to lubricate such a conventional ball screw device, normally grease or lubricant is supplied from a grease nipple 207 attached to the ball screw nut 202 to a ball circulation passage for lubricating a rolling element.

However, particularly when the ball screw device adopting such a lubrication system directly using lubricant or grease is used in a high-temperature environment or a environment wherein wood chips, etc., easily absorbing lubricants are existed, the filled lubricant or grease flows out to the outside, is exhausted fast, and must be again supplied repeatedly for a short term. Japanese Utility Model Unexamined Publication No. Hei 7-4952 is known as application relating to an oil-containing polymer lubrication ball screw to improve this point.

For the oil-containing polymer lubrication ball screw disclosed here, a lubricant supply member mounted on a ball screw nut is formed of lubricant-containing rubber or synthetic resin and the lubricant continuously exuding from the lubricant supply member is automatically supplied to a rolling element lubrication passage of the ball screw nut.

However, with the ball screw, as the lubricant supply member containing the lubricant runs with the ball screw nut while coming in contact with the screw shaft, the lubricant exudes from the contact part for lubrication; lubricant supplied to a guide rail is easily absorbed particularly in an environment wherein foreign materials such as wood chips easily absorbing lubricant are existed, and the lubricant can also be absorbed from the lubricant-containing polymer member; resultantly, it is feared that a lubrication failure may be invited.

SUMMARY OF THE INVENTION

It is therefore an object of the invention to provide a feed screw device for enabling a lubricant-containing member to come in uniform contact with an outer peripheral surface of a screw shaft without enlarging the outer diameter of the feed screw device and in a simple structure.

According to the invention, there is provided a feed screw device comprising a screw shaft, a nut member threadably engaging an outer periphery of the screw shaft, and a lubricant supply device being fixed to the nut member, coming in contact with the outer peripheral surface of the screw shaft, and having a predetermined elastic force, wherein at least the portion of the lubricant supply device facing the screw shaft is rubber or synthetic resin containing a lubricant, wherein a notch is made in the outer periphery of the lubricant supply device, and wherein an expansion member fitted at least with the notch pressed in the circumferential direction of the lubricant supply device is inserted into the notch.

In the structure, when the expansion member is inserted into the notch of the lubricant supply device, it causes the notch to push and widen at least the outer periphery of the lubricant supply device in the circumferential direction.

Thus, a compression force along the circumferential direction acts on the inside of the outer periphery of the lubricant supply device, at least deforming all the inner peripheral surface in the inner diameter direction. Resultantly, the inner diameter of the lubricant supply device is reduced for absorbing a dimension error of the lubricant supply device, and the inner peripheral surface of the lubricant supply device comes in contact with the outer peripheral surface of the screw member.

As the feed screw device is driven, a lubricant contained in the lubricant supply device exudes gradually over time, whereby slide resistance between the outer peripheral surface of the screw member and the inner peripheral surface of the lubricant supply device is decreased and as the feed screw device is driven, a lubricant is supplied to the outer peripheral surface of the screw member.

In the feed screw device according to the present invention, all the inner peripheral surface of the lubricant supply device can be brought into contact with the outer peripheral surface of the screw shaft by only inserting the expansion member into a part of the lubricant supply device (notch), so that any member, such as a garter spring to be installed on all the outer peripheral surface of the lubricant supply device which was needed by the conventional lubricant supply device can be eliminated.

In the case where the expansion member is formed with a projection which is projected from a part of the outer peripheral surface of the lubricant supply device and is fitted into a part of the nut member, etc., it is possible that the expansion member also serves prevention of rotation of the lubricant supply device.

In addition, according to the invention, there is provided in a screw transmission device comprising a screw shaft, a nut member threadably engaging an outer periphery of the screw shaft, and a ring-like lubricant supply device being disposed in the nut member with one axial end face opposed axially to the nut member and an inner peripheral surface opposed to an outer peripheral surface of the screw shaft, wherein at least the portion of the lubricant supply device facing the screw shaft is rubber or synthetic resin containing a lubricant, the improvement which comprises a press member having a portion opposed axially to an axial opposed end face of the lubricant supply device and being fixed to the nut member and a projection projecting from the press member to the lubricant supply device and inserted into the lubricant supply device.

Further, in the screw transmission device, at least two projections can also be provided and inserted into the lubricant supply device so that pilot pressure in the circumferential direction is put on the lubricant supply device as load.

In the structure, the device is sandwiched between the press member and the nut member, so that an axial movement of the lubricant supply device relative to the nut member is restricted and the projection projecting from the press member prevents the lubricant supply device from rotating with the screw shaft.

That is, an axial movement and rotation of the lubricant supply device can be prevented by only fitting the press member having the projection.

As the screw transmission device is driven, a lubricant contained in the lubricant supply device exudes gradually over time, so that slide resistance between the outer peripheral surface of the screw member and the inner peripheral surface of the lubricant supply device is decreased and as the screw transmission device is driven, a lubricant is supplied to the outer peripheral surface of the screw member.

Here, a pair of the projections may be provided approaching each other and the projection span may be set smaller than the span between the paired projection insertion positions disposed in the lubricant supply device. In doing so, by sandwiching between the paired projections, pilot pressure in the circumferential direction is put as load and such a force to hold down the screw shaft acts on the inner peripheral surface of the lubricant supply device.

Further, it is another object of the invention to provide a long-life feed screw device stable over a long term by automatically replenishing a lubricant supply member with a lubricant for suppressing occurrence of a lubrication failure.

To the end, according to a second aspect of the invention, there is provided, in a feed screw device comprising a screw shaft, a screw nut threadably engaging an outer periphery of the screw shaft, and a lubricant supply device being disposed at both ends of the screw nut for sealing the gap opening between the screw nut and the screw shaft, the improvement wherein the lubricant supply member is made of a lubricant-containing polymer member, the lubricant-containing polymer member being formed with lubricant reserve parts.

According to invention, the lubricant-containing polymer member seals both the ends of the screw nut and shuts off the inside of the screw nut from the external atmosphere, whereby even if the feed screw device is used in the external atmosphere which is of a bad environment wherein wood chips, etc., easily absorbing lubricant are existed, the inside of the screw nut is protected against the wood chips, etc., and the smooth lubrication effect can be maintained over a long time.

As a lubricant exudes from the lubricant-containing polymer member and is consumed, the lubricant-containing polymer member is replenished with a new lubricant sealed in the lubricant reserve parts, so that the lubricant exudes from the lubricant-containing polymer member over a long time even in atmosphere wherein wood chips, etc., easily absorb the lubricant supplied to a guide rail, so that stable lubrication can be carried out for a long time.

If foreign materials such as wood chips are deposited on the lubricant-containing polymer member and the lubricant is absorbed from the portion, the lubricant-containing polymer member is replenished with a lubricant from the lubricant reserve parts, thus it is not feared that a lubrication failure will be invited.

Specifically, the lubricant reserve parts formed in the lubricant supply device may be lubricant reserve holes made near the sealed face of the screw shaft or a lubricant reserve peripheral groove extending surrounding the screw shaft. If an annular recess is made in the screw nut and the lubricant supply member is fitted into the annular recess and the lubricant reserve holes or the lubricant reserve peripheral groove is closed on the inner peripheral surface or bottom face of the recess, a lubricant filled in the lubricant reserve holes or the lubricant reserve peripheral groove can be sealed by a simple structure.

If the lubricant reserve peripheral groove is formed, the lubricant-containing polymer member is replenished uniformly with a new lubricant sealed in the lubricant reserve peripheral groove, thus stable lubrication can be carried out for a long time. If a plurality of the lubricant reserve holes are made in the circumferential direction surrounding the screw shaft, the lubricant-containing polymer member is replenished uniformly with a new lubricant in the lubricant reserve holes, thus stable lubrication can be carried out for a long time.

If a reinforcing plate is disposed overlapping the lubricant-containing polymer member so as to shut off the lubricant-containing polymer member from the external atmosphere, it prevents wood chips, dust, etc., from coming in contact with the lubricant-containing polymer member, so that absorbing the lubricant in wood chips, dust, etc., from the portion can be prevented. If a reinforcing plate is disposed so that a compression force acts on the lubricant-containing polymer member, the lubricant-containing polymer member can be adjusted in hardness and insufficient strength by the reinforcing plate, and breakage, cracks, etc., of the lubricant-containing polymer member can be prevented. Since the reinforcing plate is provided, a metal reinforcing plate (mandrel) need not be used; a problem of adhesion between the lubricant-containing polymer member containing a large amount of lubricant and the metal reinforcing plate need not be considered.

Further, if the lubricant-containing polymer member is formed with communication holes from the lubricant reserve parts (lubricant reserve holes, lubricant reserve peripheral groove) to the face coming in contact with the screw shaft, the lubricant sealed in the lubricant reserve parts flows out into the screw shaft through the communication holes. Thus, an appropriate lubricant-containing polymer member is provided for a device requiring a large amount of lubricant.

For example, a lubricant-containing polymer member can be adopted as the lubricant supply device containing a lubricant according to the invention.

For example, the product manufactured in the following manner can be used as the lubricant-containing polymer member: Any of paraffin hydrocarbon oil such as polyolefin oil, naphthene hydrocarbon oil, mineral oil, ether oil such as dialkyl diphenyl ether oil, or ester oil such as phthalate ester or trimellitate is mixed as a lubricant with a polymer selected from the group consisting of polyolefin polymers basically having the same chemical structure such as polyethylene, polypropylene, and polymethylpentane and the mixture is fused, then poured into a predetermined mold and cooled and fixed under pressure.

Various additive agents such as an antioxidant, a rust preventive, a wear inhibitor, a defoaming agent, and an extreme pressure agent may be previously added to the mixture.

The percentage composition of the lubricant-containing polymer member may be set to 20%–80% by weight of polyolefin polymer and 80%–20% by weight of lubricant with respect to all weight, because if the polyolefin polymer is less than 20% by weight, hardness, strength, etc., required as the lubricant supply device cannot be provided and if the polyolefin polymer exceeds 80% by weight (the lubricant is less than 20% by weight), lubricant supply lessens and the slide torque reduction and lubricant supply effects decrease.

The above-mentioned polymers have the same basic structure and differ in average molecular weight, covering the range of $1 \times 10^3$ to $5 \times 10^6$. Among the polymers, those of comparatively low molecular weight ranging from $1 \times 10^3$ to $5 \times 10^5$ and those of ultra high molecular weight ranging from $1 \times 10^6$ to $5 \times 10^6$ are used solely or mixed as required.

To improve the mechanical strength of the lubricant supply device, the following thermoplastic resin and thermosetting resin may be added to the polyolefin polymer:

Resin such as polyamide, polycarbonate, polybutylene terephthalate, polyphenylene sulfide, polyether sulfone, polyether ether ketone, polyamide imide, polystyrene, or ABS resin can be used as the thermoplastic resin.

Resin such as unsaturated polyester resin, urea resin, melamine resin, phenol resin, polyimide resin, or epoxy resin can be used as the thermosetting resin.

The resins may be used solely or mixed.

Further, to disperse the polyolefin polymer and any other resin in a more uniform state, a proper compatibilization agent may be added as required.

In addition to the polyolefin polymer and lubricant combinations as described above, polyurethane rubber cured in a grease-containing condition can also be used as the lubricant-containing polymer, as described below in detail:

Polyurethane rubber is a compound produced by reaction of polyisocyanate with an activated hydrogen compound.

Tolylene diisocyanate (TDI), hexamethylene diisocyanate (MDI), prepolymer (MW1000-MW2000) produced by reaction of TDI and MDI with an activated hydrogen compound, such as castor oil, or the like can be used as polyisocyanate.

A long chain activated hydrogen compound such as hydrocarbon of polybutadiene, etc., polyether of polyoxypropylene, etc., caster oil or caster oil series polyol, polyester, or polycarbonate, a polyhydroxy compound such as water or ethylene glycol, or a short chain activated hydrogen compound such as amino alcohol, or polyamino compound can be used as the activated hydrogen compound.

Normal grease such as mineral oil or lithium soap grease can be used as the grease.

In this case, preferably the percentage composition of the lubricant-containing polymer member may be set to 80%–40% by weight of polyurethane rubber and 20%–60% by weight of grease with respect to all weight. If polyurethane rubber is less than 40% by weight, necessary hardness, strength, etc., cannot be provided.

If polyurethane rubber exceeds 80% by weight (grease is less than 20% by weight), lubricant supply lessens and the slide torque reduction effect decreases.

BRIEF DESCRIPTION OF THE DRAWING

In the accompanying drawings:

FIGS. 7(a) and 7(b) are illustrations to explain the effects of notches and expansion members according to the first embodiment of the invention; 7(a) shows a state before the expansion members are inserted and 7(b) show a state after the expansion members are inserted;

FIG. 8 is a sectional view to show the main part of a ball screw according to a second embodiment of the invention;

DESCRIPTION OF THE PREFERRED EMBODIMENTS

Referring now to the accompanying drawings, there are shown preferred embodiments of the invention. In the embodiments, feed screw devices will be discussed by taking ball screws as examples. Of course, the description to follow goes for other feed screw devices such as square threads.

Figure 1:
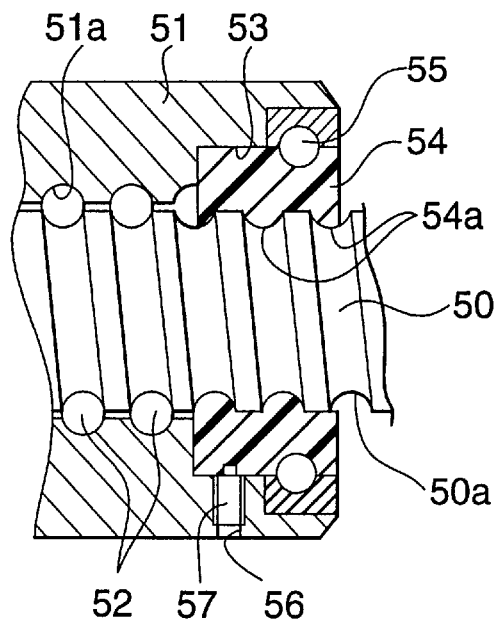
FIG. 1 is a fragmentary sectional view to show the main part of a conventional ball screw.
Figure 2:
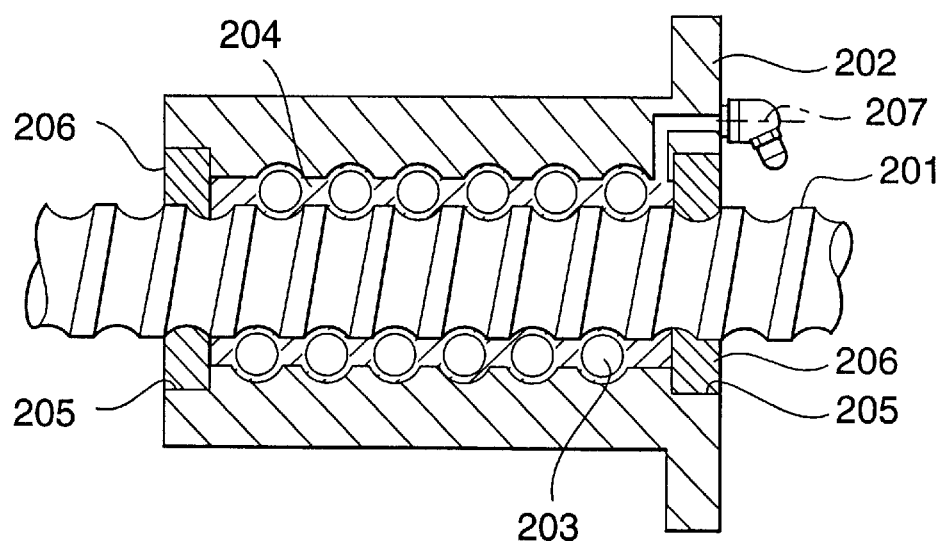
FIG. 2 is a sectional view to show a conventional feed screw device.
Figure 3:
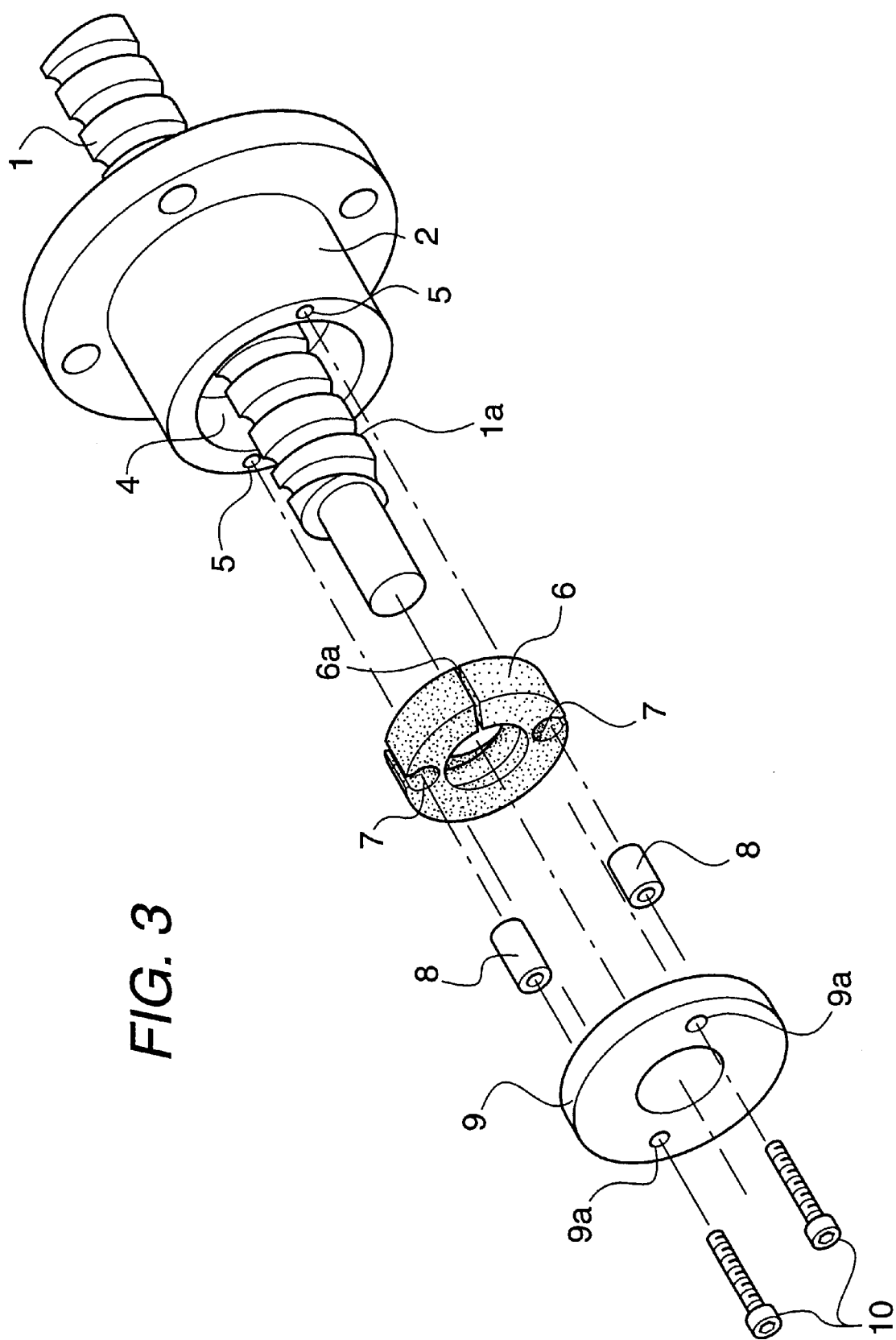
FIG. 3 is an exploded perspective view to show the main part of a ball screw according to a first embodiment of the invention.
Figure 4:
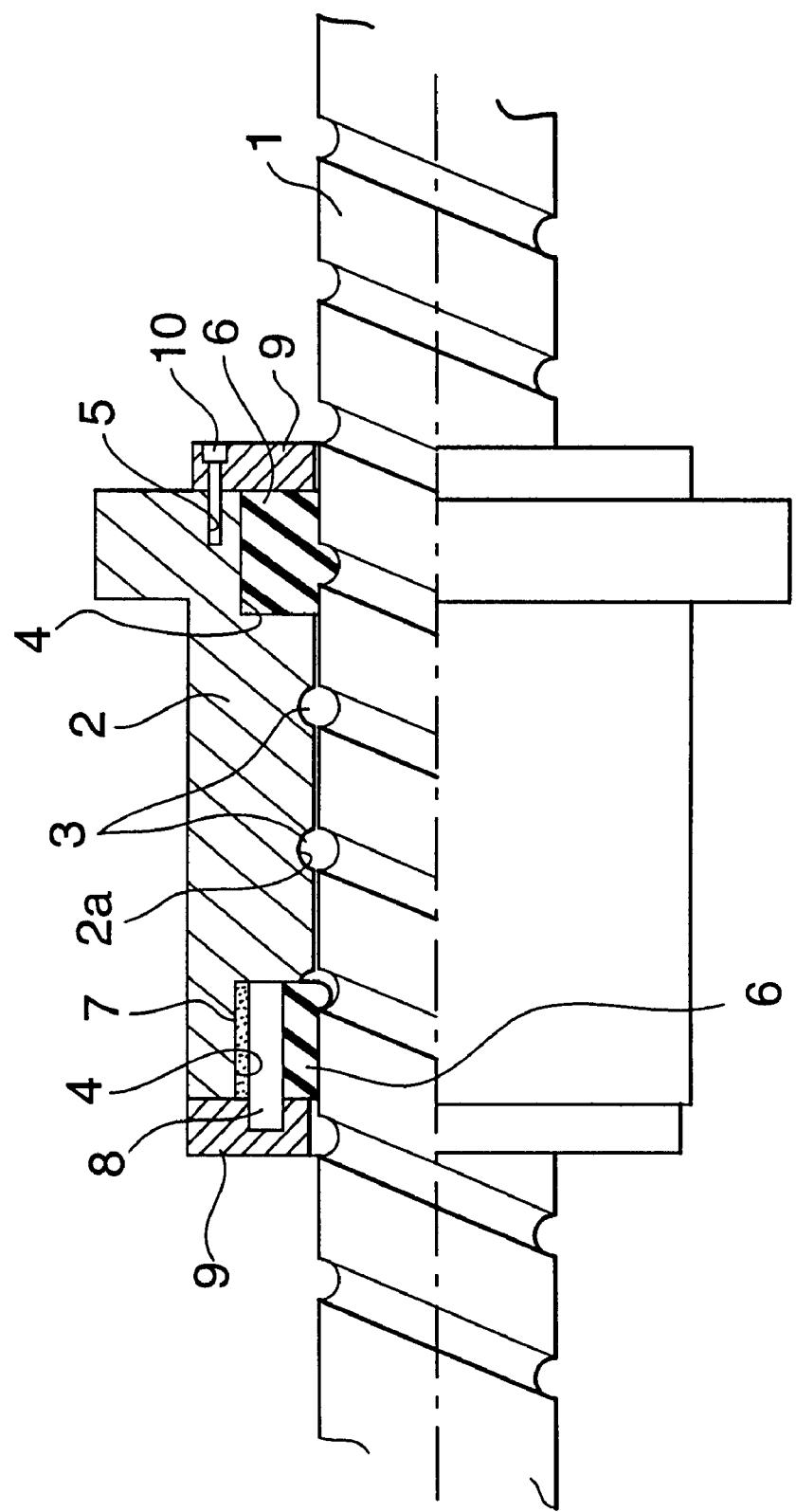
FIG. 4 is a sectional view to show the main part of a ball screw according to the first embodiment of the invention.

FIG. 3 is an exploded perspective view to show the main part of a ball screw according to a first embodiment of the invention and FIG. 4 is a sectional view of the main part.

First, a general configuration of the first embodiment will be discussed. The ball screw comprises a nut member 2 threadably engaged into a screw shaft 1 having a spiral thread groove 1a on an outer peripheral surface via a large number of balls 3. The nut member 2 is formed in an inner peripheral surface with a thread groove 2a corresponding to the thread groove 1a of the screw shaft 1 and has a ball circulation passage (not shown) for guiding and circulating the balls 3 rolling in both the thread grooves 1a and 2a in a thick barrel portion.

An annular recess 4 for attaching a lubricant supply device is formed in both end faces of the inner diameter side of the nut member 2 coaxially with the nut member 2. Two tapped holes 5 are made in each of both the end faces of the nut member 2 with the axes parallel with the axis of the nut member 2. A lubricant supply device 6 is fitted into the recess 4 of the nut member 2 coaxially.

Figure 5:
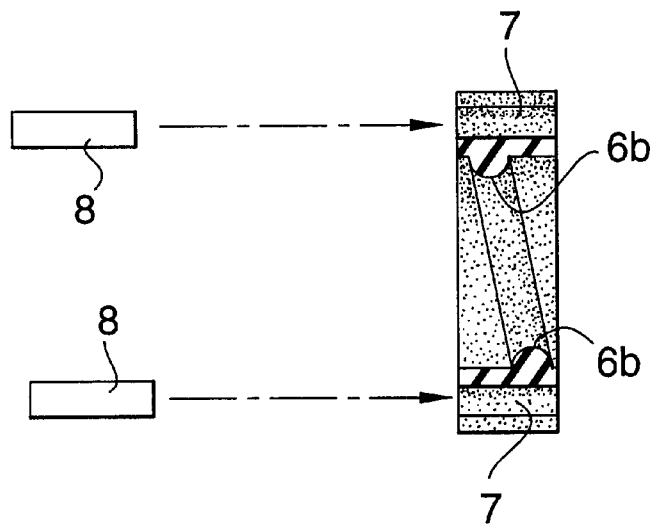
FIG. 5(a) and 5(b) are views to show a lubricant supply device according to the first embodiment of the invention; 5(a) and 5(b) are a sectional view and a front view of the lubricant supply device respectively.
Figure 5:
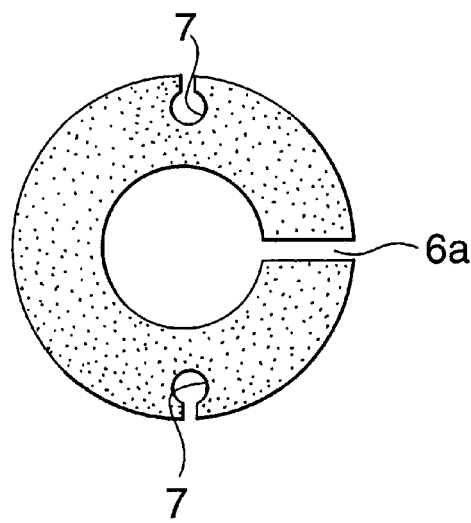

The lubricant supply device 6 is a ring-like member having an outer diameter that can be fitted into the recess 4, as shown in FIG. 5; for example, it is made of a material such as rubber or synthetic resin for producing a predetermined elastic force for providing flexibility and contains a lubricant such as grease or mineral oil.

The lubricant supply device 6 has an assembly cut part 6a at a place in a circumferential direction of the lubricant supply device 6 and is formed with notches 7 at outer peripheral positions shifted by 90 degrees from the cut part 6a in the circumferential direction, whereby the two notches 7 are formed at symmetrical positions mutually shifted 180 degrees in the circumferential direction. In the embodiment, the notches 7 are made circular in cross section extending in a thickness direction of the lubricant supply device 6.

Further, projections 6b that can be fitted into the thread groove 1a of the screw shaft 1 project in the inner diameter direction on the inner peripheral surface of the lubricant supply device 6.

Tubular members 8 are included making up an expansion member that can be fitted into the notches 7 of the lubricant supply device 6. The tubular member 8 has an external diameter slightly larger than the diameter of the notch 7 and is slightly longer than the thickness of the lubricant supply device 6.

Further, a retaining ring 9 is included for attaching the lubricant supply device 6 to the nut member 2.

Figure 6:
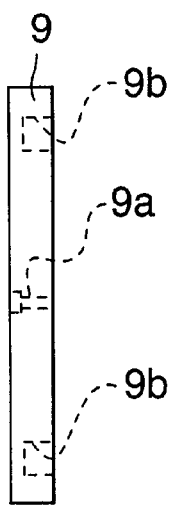
FIGS. 6(a) and 6(b) are views to show a retaining ring according to the first embodiment of the invention; 6(a) and 6(b) are a side view of the retaining ring and a front view from the outside of the retaining ring.
Figure 6:
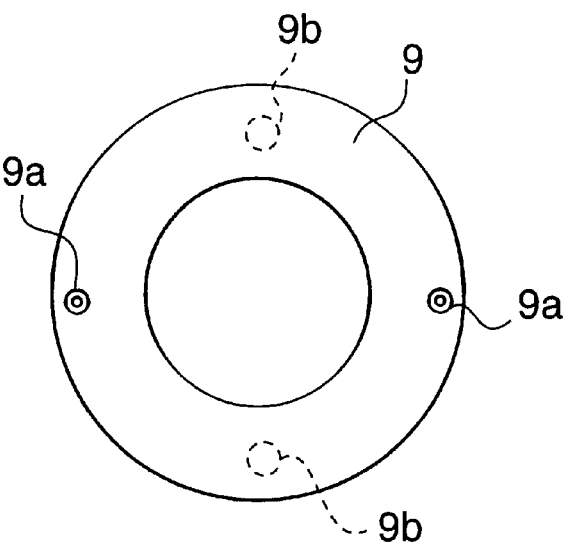

This retaining ring 9 has an inner diameter which is the same as the diameter of the nut member 2 and an inner diameter to place the retaining ring 9 out of contact with the outer peripheral surface of the screw shaft 1, as shown in FIG. 4. In addition, as shown in FIG. 6, on the face of the retaining ring 9 opposed to the nut member 2, through holes 9a are made at positions corresponding to the tapped holes 5 made in the nut member 2 and recesses 9b into which the tubular members 8 can be fitted are formed at positions corresponding to the notches 7 of the lubricant supply device 6.

First, the lubricant supply device 6 is fitted into the recess 4 and is inserted between the screw shaft 1 and the nut member 2, then the tubular members 8 are fitted into the notches 7 of the lubricant supply device 6 in parallel with the axis of the nut member 2. Alternatively, after the tubular members 8 are fitted into the notches 7, the lubricant supply device 6 is fitted into the recess 4. In the state, the ends of the tubular members 8 fitted into the notches 7 project outward.

Successively, the projecting ends of the tubular members 8 are fitted into the recesses 9b of the retaining ring 9 and the retaining ring 9 is abutted against the end of the nut member 2, then set screws 10 inserted into the through holes 9a of the retaining ring 9 are threadably engaged into the tapped holes 5 of the nut member 2. Thus, the lubricant supply device 6 is fixed to the nut member 2, as shown in FIG. 4.

Here, the lubricant supply device 6 is formed only of a lubricant-containing polymer, for example. To manufacture the lubricant supply device 6, for example, a lubricant-containing polymer is fused, then injected into a predetermined metal mold, pressurized, cooled and hardened, and molded. In this case, injection molding can be executed. For example, used as the lubricant-containing polymer member is a mixture of polyethylene consisting of 20% by weight of low molecular weight polyethylene (molecular weight $1\times10^3$ to $5\times10^5$) and 10% by weight of ultra-high molecular weight polyethylene (molecular weight $1\times10^6$ to $5\times10^6$) and 70% by weight of paraffin mineral oil as a lubricant.

Next, the operation and effects of the ball screw will be discussed.

When the screw shaft 1 makes relative rotation to the nut member 2, the balls 3 in the nut member 2 roll on a spiral space formed by the relative thread grooves 1a and 2a in the rotation direction of the screw shaft 1 and circulate through a ball circulation passage (not shown). As the balls 3 roll, the nut member 2 is fed in the linear direction along the screw shaft 1. The projections 6b of the lubricant supply device 6 prevent the lubricant filled in the ball screw from leaking to the outside and also prevent a foreign material such as dust from entering the ball screw from the outside; the lubricant supply device 6 also serves as a seal member.

Since the lubricant supply device 6 has a dimension error, it is feared that a microscopic gap may be formed between the inner peripheral surface and the outer peripheral surface of the screw shaft 1. In the embodiment, however, the tubular members 8 larger than the notches 7 are inserted into the notches 7, whereby the notches 7 push and widen the outer periphery of the lubricant supply device 6 in the circumferential direction, as shown in FIG. 7.

That is, a compression force toward the circumferential direction acts on the inside of the outer periphery of the lubricant supply device 6 and causes the full inner peripheral surface to be displaced to the inner diameter side. Resultantly, even if a dimension error exists, the full inner peripheral surface of the lubricant supply device 6 comes in reliable contact with the outer peripheral surface of the screw shaft 1.

At this time, in the embodiment, the lubricant supply device 6 is not pressed diametrically for bringing the inner peripheral surface into contact with the outer peripheral surface of the screw shaft 1; instead, the compression force along the circumferential direction causes the inner peripheral surface to come in contact with the outer peripheral surface of the screw shaft 1, thus the notches 7 need not be made in all the peripheral surface of the lubricant supply device 6. Moreover, the tubular members 8 of expansion members are only inserted into the lubricant supply device 6, so that enlarging the diameter of the nut member 2, namely, the outer diameter of the feed screw device is not required either.

Since the lubricant supply device 6 contains a lubricant, the lubricant exuding gradually from the inner peripheral surface of the lubricant supply device 6 drastically reduces frictional resistance at the sliding time between the inner peripheral surface of the lubricant supply device 6 and the outer peripheral surface of the screw shaft 1, so that slide torque lessens, preventing disturbance of drive of the ball screw.

Further, when the ball screw is driven, a lubricant exudes gradually from the inner peripheral surface of the lubricant supply device 6 with relative rotation of the screw shaft 1, is supplied to the thread groove 1a of the screw shaft 1, and uniformly covers the balls 3 rolling in the thread groove 1a and the thread groove 2a of the nut member 2 for stable lubrication over a long term.

Therefore, even if a lubricant is not supplied to the inside of the nut member 2 from the outside, the ball screw can continue good running for a long time at low torque. Since a lubricant need not be supplied to the inside of the nut member 2 from the outside, the ball screw can be used as effective lubrication means in a system that can use only an extremely small amount of lubricant, such as a semiconductor manufacturing system.

Further, as described above, the tubular members 8 are inserted into the notches 7, so that a compression force toward the circumferential direction acts on the inside of the lubricant supply device 6, also producing the effect of bringing the opposed faces of the cut parts 6a made in the lubricant supply device 6 into contact with each other or lessening the gap therebetween.

The ends of the tubular members 8 for pressing the inner peripheral surface of the lubricant supply device 6 against the outer periphery of the screw shaft 1 are fitted only into the recesses 9b of the retaining ring 9, so that when the ball screw is driven, rotation of the lubricant supply device 6 can be prevented. This means that the tubular members 8 of expansion members also have a role in stopping rotation of the lubricant supply device 6.

Next, a second embodiment of the invention will be discussed. Members identical with or similar to those previously described in the first embodiment are denoted by the same reference numerals in FIGS. 8 to 11.

The basic configuration of a ball screw of the second embodiment is similar to that of the first embodiment, as shown in FIG. B.

Figure 9:
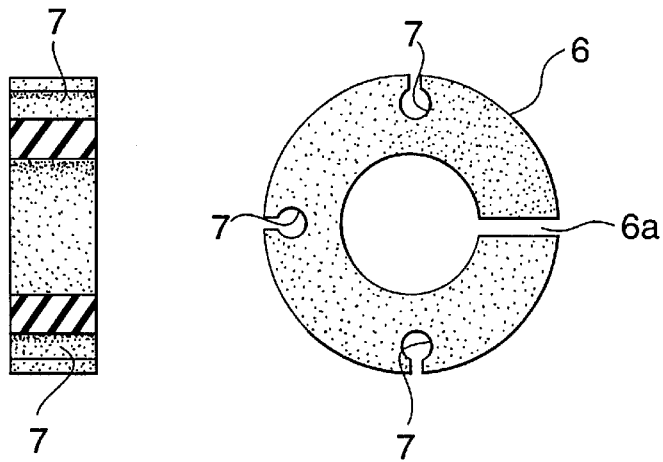
FIGS. 9(a) and 9(b) are views to show a lubricant supply device according to the second embodiment of the invention; 9(a) and 9(b) are a sectional view and a front view of the lubricant supply device respectively.
Figure 10:
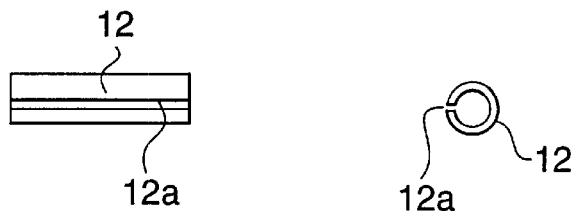
FIGS. 10(a) and 10(b) are views to show an expansion member according to the second embodiment of the invention; 10(a) and 10(b) are a side view and a front view of the expansion member respectively.
Figure 11:
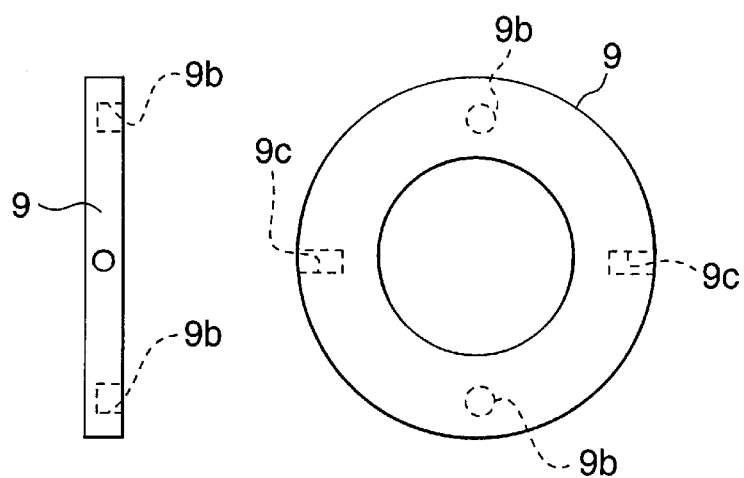
FIGS. 11(a) and 11(b) are views to show a retaining ring according to the second embodiment of the invention; 11(a) and 11(b) are a side view of the retaining ring and a front view from the outside of the retaining ring.

That is, as shown in FIG. 9, a lubricant supply device 6 is formed in an outer peripheral surface with three notches shifted by 90 degrees in the circumferential direction, but is not formed on an inner peripheral surface with projections 6b fitted into thread groove 1a of screw shaft 1.

Expansion members 12 inserted into the notches 7 are made of spring members each having a slit 12a along the axial direction, as shown in FIGS. 10(a) and 10(b), for easy assembling of the expansion members 12.

As shown in FIGS. 11(a) and 11(b), a retaining ring 9 has an outer diameter that can be fitted into a recess 4 made in a nut member 2 and has tapped holes 9c, each with an axis directed diametrically, made in the peripheral surface in place of through holes 9a. Mounting holes 13 each extending in the radial direction thereof so as to be coincided with the tapped holes 9c are also made in the nut member 2. In FIG. 8, numeral 17 denotes a set screw mounted in the tapped hole 9c and the mounting hole 13.

Other components are similar to those of the first embodiment.

The second embodiment has the function and effects similar to those of the first embodiment.

The lubricant supply device 6 is not formed on the inner peripheral surface with projections 6b that can be fitted into the thread groove 1a of the screw shaft 1. However, the inner diameter of the lubricant supply device 6 is shrunk by the action of the expansion members for pressing the inner peripheral surface of the lubricant supply device 6 against the outer peripheral surface of the screw shaft 1, thereby making contact.

Next, a third embodiment of the invention will be discussed. Members identical with or similar to those previously described in the first embodiment are denoted by the same reference numerals in FIGS. 12 and 13.

Figure 12:
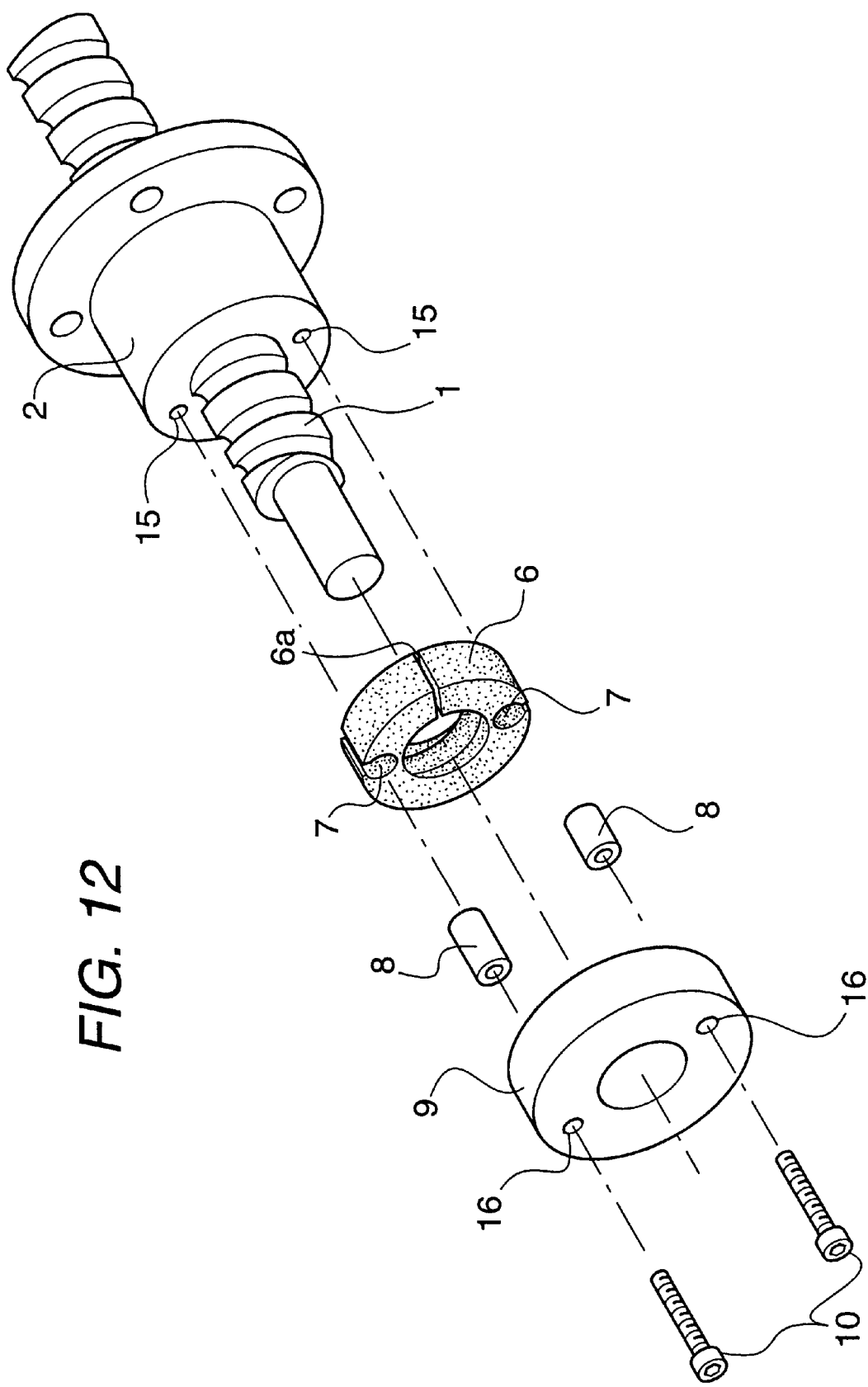
FIG. 12 is an exploded perspective view to show the main part of a ball screw according to a third embodiment of the invention.
Figure 13:
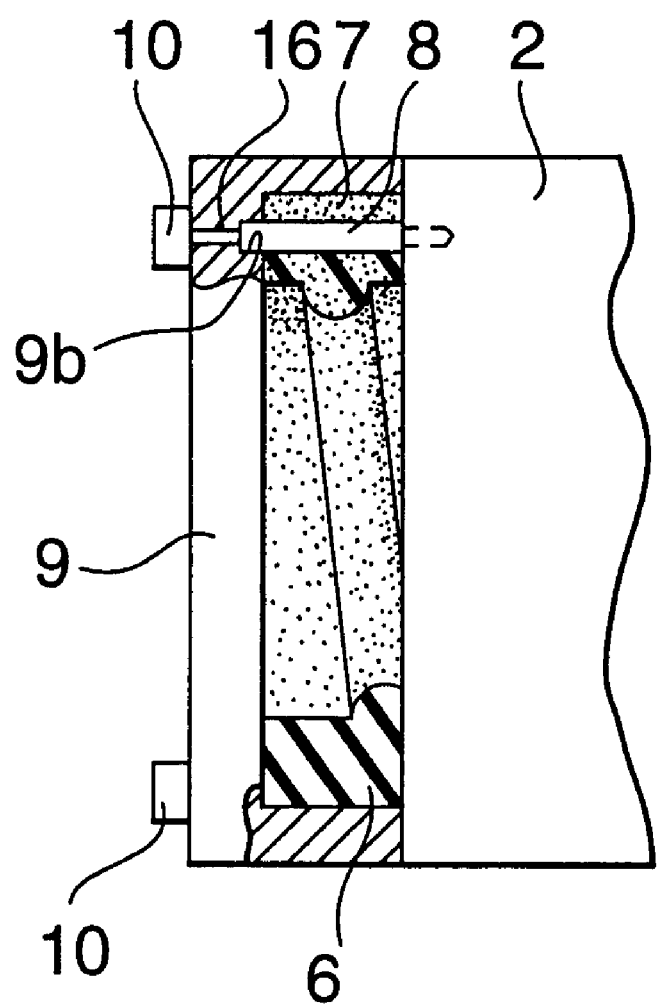
FIG. 13 is a fragmentary sectional view to show the main part of the ball screw according to the third embodiment of the invention.

The basic configuration of a ball screw of the third embodiment is similar to that of the first embodiment, as shown in FIGS. 12 and 13.

However, a lubricant supply device 6 is abutted against the end face of a nut member 2 coaxially without forming the nut member 2 with a recess into which the lubricant supply device 6 is fitted.

Tapped holes 15 are made at positions of the end face of the nut member 2 corresponding to the positions of notches 7 made in the lubricant supply device 6.

A retaining ring 9 is molded into a cap-shape that can store the lubricant supply device 6. Small-diameter tapped holes 16 directed toward the outside from the bottom faces of recesses 9b into which tubular members 8 are fitted are made in place of through holes 9a.

The tips of set screws 10 penetrating the tapped holes 16, the recesses 9b, and the tubular members 8 coaxially are threadably engaged into the tapped holes 15 of the nut member 2 for fixing the lubricant supply device 6.

Thus, without making recesses 4 in the nut member 2, the set screws 10 for fixing the lubricant supply device 6 can be laid out at the same positions as the placement positions of the tubular members 8 of expansion members.

However, at least the portion of the lubricant supply device 6 coming in contact with the outer peripheral surface of a screw shaft 1, namely, only the inner peripheral surface may be made of a member containing a lubricant.

Further, the lubricant supply device 6 may have only the inner diameter side softened. In doing so, the hardness for holding the shape required as the lubricant supply device 6 can be provided on the outer peripheral surface side and the displacement amount in the inner diameter direction on the inner peripheral side produced by a compression force along the circumferential direction can be set large and press pressure against the outer peripheral surface of the screw shaft 1 can be set small.

Further more, although in the embodiments two or three notches 7 are provided, one notch 7 or four or more notches 7 may be made. The notches 7 need not be of the same shape.

The shape is not limited to circular cross section and may be angular cross section; the axis of the notch 7 need not necessarily be set in parallel with the axis of the nut member 2.

In the embodiments, the notches 7 are opened to the outer periphery of the lubricant supply device 6, but may be formed into a hole with the outer periphery side closed. However, the notch opened to the outer periphery produces a larger effect.

The hollow tubular members are adopted for the expansion members as an example, but the expansion members are not limited to them; they may be like a circular cylinder and the cross section is not limited to being circular.

Further, in the embodiments, the ends of the expansion members are projected to the side of the retaining ring 9, but may be projected to the side of the nut member 2 and the corresponding recesses may be made on the side of the number member 2. A portion projecting toward the outer peripheral direction of the lubricant supply device 6 may be made on the outer periphery of the expansion member for use as a rotation stopper.

In the embodiments, the lubricant supply device 6 also serves as a seal member, but a separate seal member may be provided.

Next, a fourth embodiment of the invention will be discussed. Members identical with or similar to those previously described in the first embodiment are denoted by the same reference numerals in FIGS. 14 to 16 and will not be discussed again.

Figure 14:
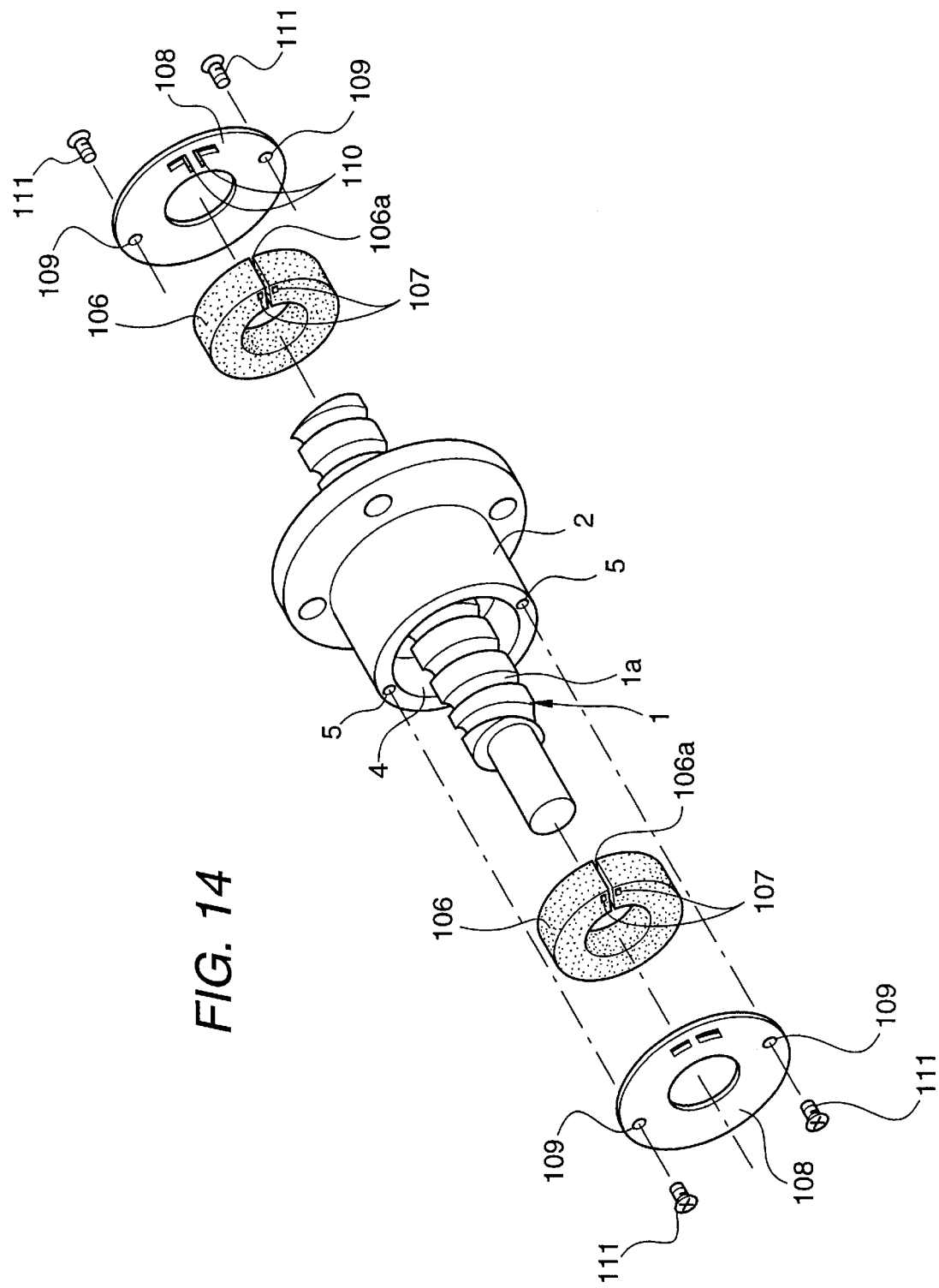
FIG. 14 is an exploded perspective view to show the main part of a ball screw according to a fourth embodiment of the invention.
Figure 15:
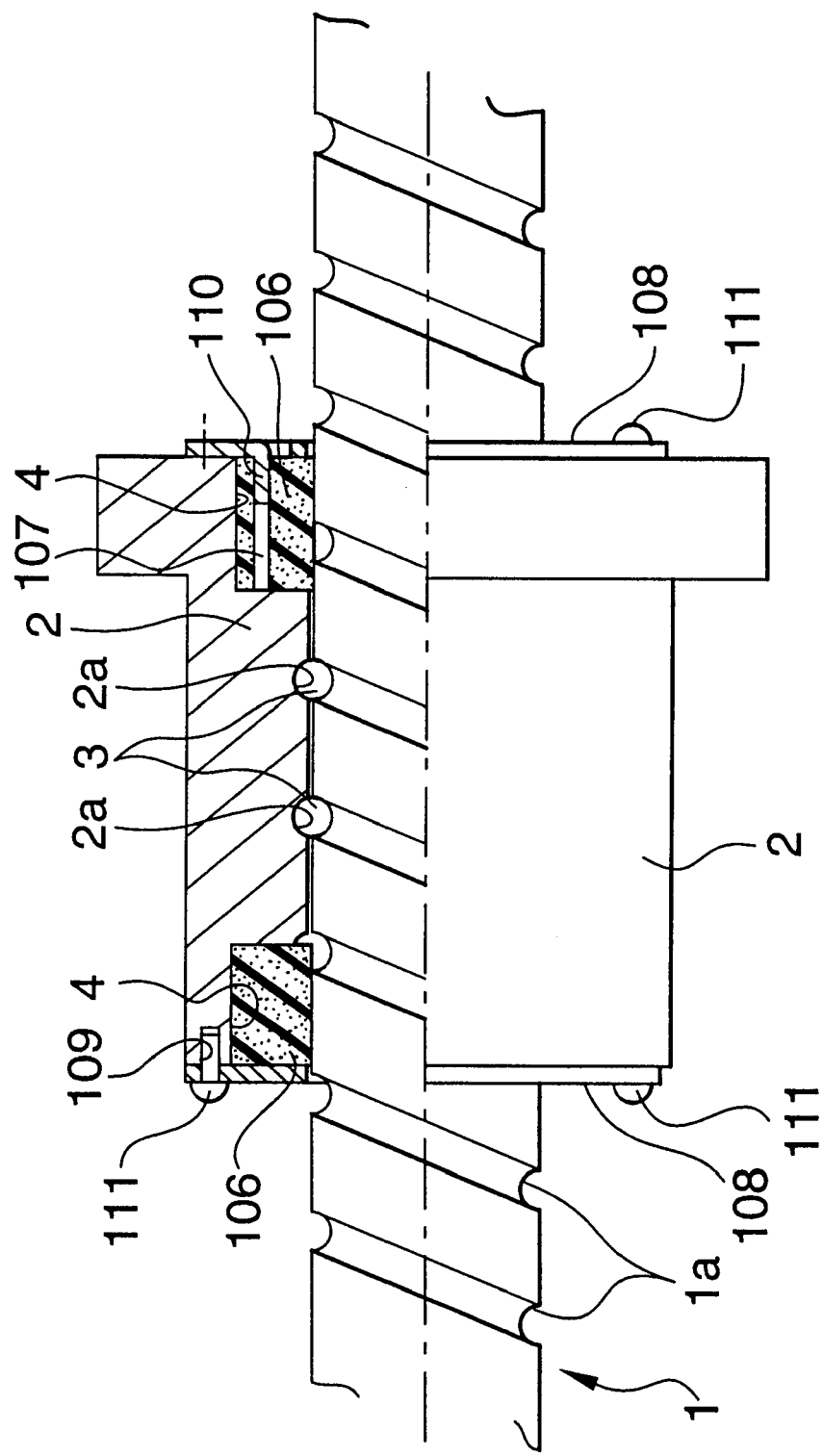
FIG. 15 is a sectional view to show the main part of the ball screw according to the fourth embodiment of the invention.

A lubricant supply device 106 has a cut part 106a for assembly in the circumferential direction and two insertion holes 107 made with the cut part 106a. The two insertion holes 107 are paired and are made so as to extend in parallel with the axis of the lubricant supply device 106. In FIGS. 14 and 15, the insertion holes are shown as through holes, but may be holes each having the bottom surface.

Further, a fixed ring 108 for attaching the lubricant supply device 106 to a nut member 2 is included. It provides a press member with one surface facing the axial opposed end face of the lubricant supply device 106.

The fixed ring 108 is a disk-like member having an inner diameter which is the same as the outer diameter of the nut member 2 and an inner diameter to place the fixed ring 108 out of contact with the outer peripheral surface of the screw shaft 1. On the face opposed to the nut member 2, through holes 109 are made at positions corresponding to tapped holes 5 made in the nut member 2. In addition, projections 110 projecting toward the lubricant supply device 106 are formed at positions corresponding to the insertion holes 107 of the lubricant supply device 106.

The span between the two projections 110 is set slightly smaller than that between the paired insertion holes 107. In the embodiment, the projection 110 is formed by cutting a part of the fixed ring 108 and bending the part to the lubricant supply device 106. That is, the projections 110 can be made by press working, etc.

Assembling process of the lubricant supply device according to the fourth embodiment will be described hereinafter.

First, the lubricant supply device 106 is fitted into a recess 4 of the nut member 2 and is inserted between the screw shaft 1 and the nut member 2. In the state, one axial end face of the lubricant supply device 6 is opposed axially to the bottom face of the recess 4 of the nut member 2 and the inner peripheral surface of the lubricant supply device 106 is opposed diametrically to the outer peripheral surface of the screw shaft 1.

Successively, the projections 110 of the fixed ring 108 are inserted into the insertion holes 107 of the lubricant supply device 106 and set screws 111 inserted into the through holes 109 are threadably engaged into the tapped holes 5 with the outer periphery of the fixed ring 108 abutted against the end of the nut member 2 coaxially, so that the fixed ring 108 is fixed to the nut member 2.

Here, the lubricant supply device 106 is formed only of a lubricant-containing polymer, for example. To manufacture the lubricant supply device 106, for example, a lubricant-containing polymer is fused, then injected into a predetermined metal mold, pressurized, cooled and hardened, and molded. In this case, injection molding can be executed. For example, used as the lubricant-containing polymer member is a mixture of polyethylene consisting of 20% by weight of low molecular weight polyethylene (molecular weight $1 \times 10^3$ to $5 \times 10^5$) and 10% by weight of ultra-high molecular weight polyethylene (molecular weight $1 \times 10^6$ to $5 \times 10^6$) and 70% by weight of paraffin mineral oil as a lubricant.

Next, the operation and effects of the ball screw will be discussed.

When the screw shaft 1 makes relative rotation to the nut member 2, balls 3 in the nut member 2 roll on a spiral space formed by the relative thread grooves 1a and 2a in the rotation direction of the screw shaft 1 and circulate through a ball circulation passage (not shown). As the balls 3 roll, the nut member 2 is fed in the linear direction along the screw shaft 1. The inner peripheral surface of the lubricant supply device 106 prevents the lubricant filled in the ball screw from leaking to the outside and also prevent a foreign material such as dust from entering into the ball screw from the outside; the lubricant supply device 106 also serves as a seal member.

When the screw shaft 1 makes relative rotation to the nut member 2 and then the nut member 2 is moved in the axial direction, rotation torque and an axially external force are applied to the lubricant supply device 106 as load.

However, in the embodiment, the lubricant supply device 106 is sandwiched axially between the bottom face of the recess 4 of the nut member 2 and the fixed ring 108, thus an axial movement of the lubricant supply device 106 is blocked. Resultantly, jump out of the lubricant supply device 106 from the nut member 2 can be prevented.

In addition, the projections 110 projected from the fixed ring 8 are inserted into the insertion holes 107 of the lubricant supply device 106, so that rotation of the lubricant supply device 106 in the circumferential direction can be prevented. Resultantly, when the screw shaft 1 rotates, the lubricant supply device 106 does not rotate with the screw shaft 1 and comes in sliding contact with the outer peripheral surface of the screw shaft 1.

At this time, since the lubricant supply device 106 contains a lubricant, the lubricant exuding gradually from the inner peripheral surface of the lubricant supply device 106 drastically reduces frictional resistance at the sliding time between the inner peripheral surface of the lubricant supply device 106 and the outer peripheral surface of the screw shaft 1, so that slide torque lessens, preventing disturbance of drive of the ball screw and lessening the rotation force input to the lubricant supply device 106.

Further, when the ball screw is driven, a lubricant exudes gradually from the inner peripheral surface of the lubricant supply device 106 with relative rotation of the screw shaft 1 as described above, is supplied to the thread groove 1a of the screw shaft 1, and uniformly covers the balls 3 rolling in the thread groove 1a and the thread groove 2a of the nut member 2 for stable lubrication over a long term.

Therefore, even if a lubricant is not supplied to the inside of the nut member 2 from the outside, the ball screw can continue good running for a long time at low torque. Since a lubricant need not be supplied to the inside of the nut member 2 from the outside, the ball screw can be used as effective lubrication means in a system that can use only an extremely small amount of lubricant, such as a semiconductor manufacturing system.

Figure 16:
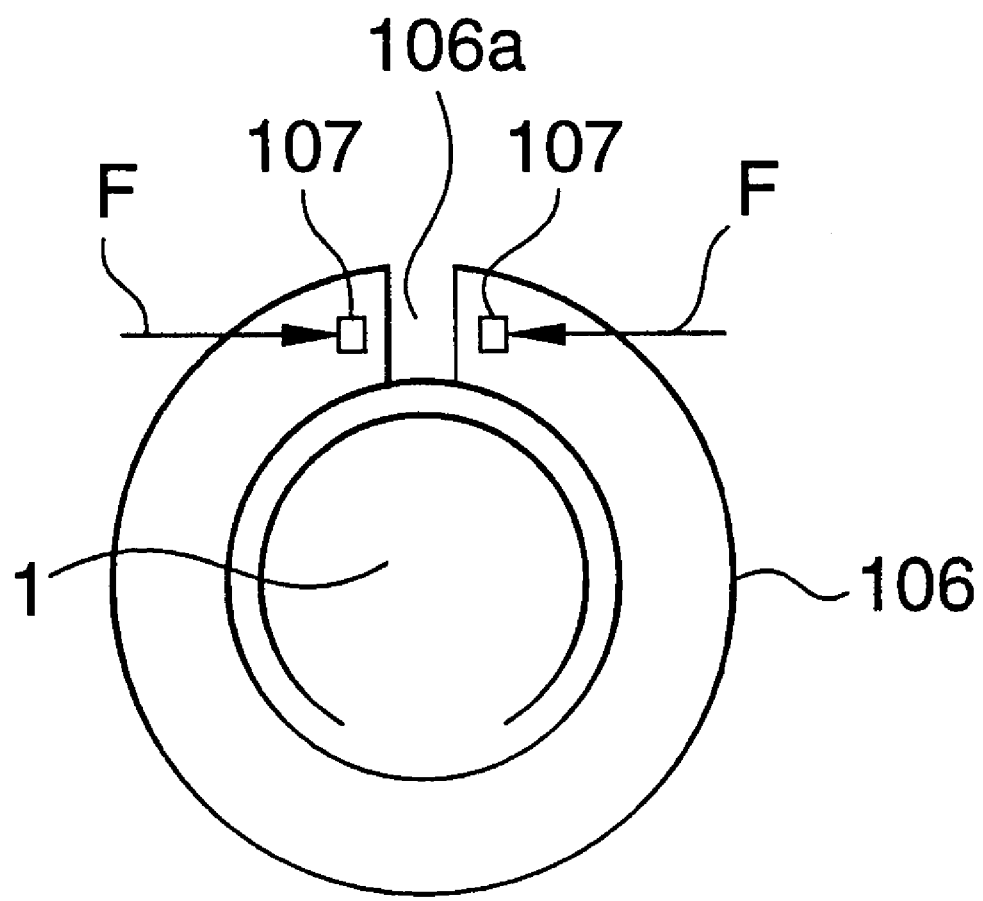
FIG. 16 is an illustration to explain the functions of projections and insertion holes according to the fourth embodiment of the invention.

Since the span between the projections 110 is set slightly smaller than that between the paired insertion holes 107 made in the lubricant supply device 106, the projections 110 inserted into the insertion holes 107 give such pilot pressure F to make the opposed faces between the cut parts 106a approach each other or press the opposed faces, as shown in FIG. 16. As a result of the pilot pressure F, even if the lubricant supply device 106 contains a dimension error, such a force to hold the screw shaft 1 acts, causing the inner peripheral surface of the lubricant supply device 106 to come in reliable contact with the outer peripheral surface of the screw shaft 1.

At this time, the lubricant supply device 106 is not pressed diametrically for bringing the inner peripheral surface of the lubricant supply device 106 into contact with the outer peripheral surface of the screw shaft 1 and such a force to hold the screw shaft 1 causes the inner peripheral surface of the lubricant supply device 106 to come in contact with the outer peripheral surface of the screw shaft 1. If the insertion holes 107 and the projections 110 are not made on all the periphery of the lubricant supply device 106 in the circumferential direction, all the inner peripheral surface of the lubricant supply device 106 can come in reliable contact with the screw shaft 1. Moreover, the insertion holes 110 are only inserted into the insertion holes 107 of the lubricant supply device 106, so that it is not necessary to enlarge the diameter of the nut member 2, namely, the outer diameter of the screw device.

By only assembling the fixed ring 108 having the projections 110 of a simple structure, jump out of the lubricant supply device 106 from the nut member 2 can be prevented, the lubricant supply device 106 can be prevented from rotating with the screw shaft 1, and the inner peripheral surface of the lubricant supply device 106 can be brought into contact with the outer peripheral surface of the screw shaft 1.

Note that a pipe-shaped spacer may be previously inserted into the insertion hole 107 of the lubricant supply device 106 for preventing distortion between the projection 110 and the insertion hole 107 when rotation force is input.

In this embodiment, although a set of a pair of insertion holes and a pair of projections is taken as an example, a set of two or more pairs of insertion holes or three or more insertion holes and two or more pairs of projections or three or more projections can be provided.

Next, a fifth embodiment of the invention will be discussed. Members identical with or similar to those previously described in the fourth embodiment are denoted by the same reference numerals in FIGS. 17 and 18.

Figure 17:
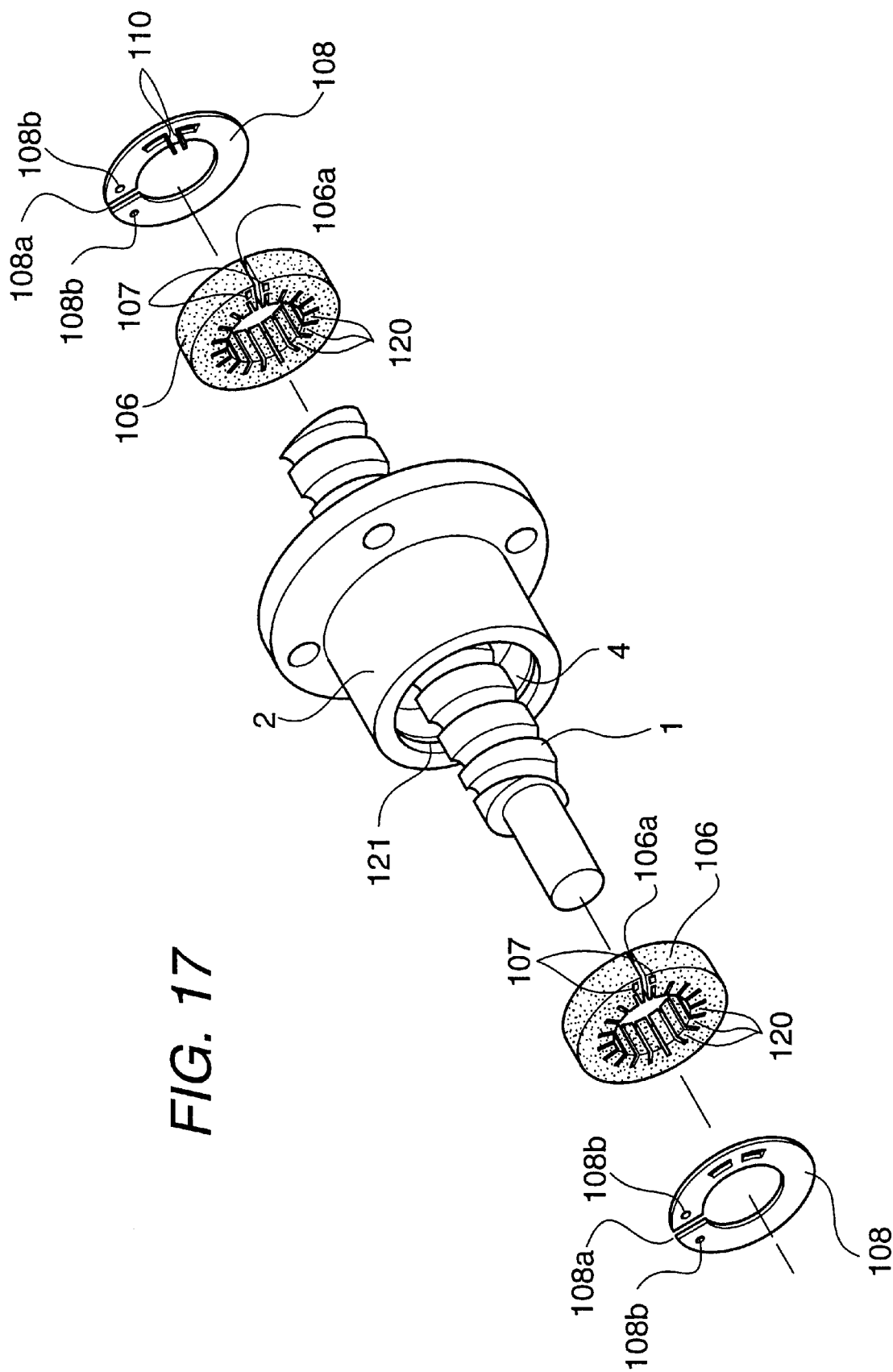
FIG. 17 is an exploded perspective view to show the main part of a ball screw according to a fifth embodiment of the invention.
Figure 18:
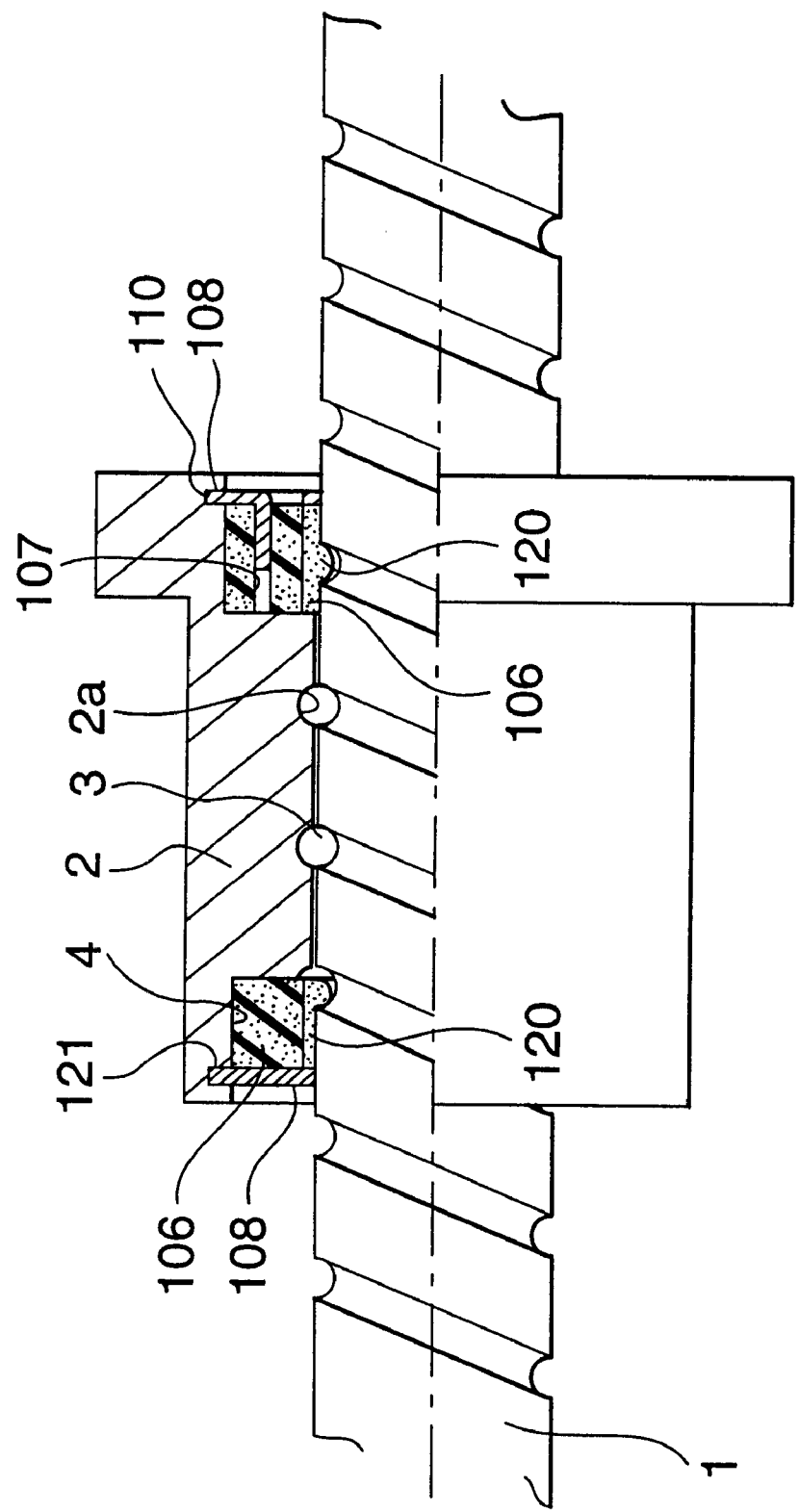
FIG. 18 is a sectional view to show the main part of the ball screw according to the fifth embodiment of the invention.

The basic configuration of a ball screw of the fifth embodiment is similar to that of the fourth embodiment, as shown in FIGS. 17 and 18.

However, a plurality of lip parts 120 are projected along the circumferential direction toward the inner peripheral surface of a lubricant supply device 106 and come in sliding contact with the outer peripheral surface of a screw shaft 1.

A fixed ring 108 providing a press member has an outer diameter set slightly larger than the diameter of a recess 4 of a nut member 2 and has a part cut in the circumferential direction instead of a through hole 109 shown in the fourth embodiment. A pair of mounting holes 108b are made in the proximity of the cut part 108a.

A ring-like fit groove 121 into which the fixed ring 108 can be fitted is formed in the inner peripheral surface of the recess 4 of the nut member 2.

After the lubricant supply device 106 is engaged into the recess 4, the fixed ring 108 is fitted into the fit groove 121 in the recess 4. To fit the fixed ring 108, the mounting holes 108b are used to lessen the distance between the opposed faces of the cut part 106a for reducing the diameter of the fixed ring 8. In this state, the fixed ring 108 is inserted into the recess 4.

Also in this case, projections of the fixed ring 108 are inserted into insertion holes 107 of the lubricant supply device 106.

Other components and the function and effects of the fifth embodiment are similar to those of the fourth embodiment.

However, the portions of the lubricant supply device 106 coming in contact with the screw shaft 1 are formed as the lip parts 120 so as to provide interference, so that the inner periphery of the lubricant supply device 106 comes in reliable contact with the outer peripheral surface of the screw shaft 1 even if pilot pressure F, etc., is not given. Thus, it is possible to eliminate the pilot pressure F.

Even if the interference state is set up, press pressure put on the outer peripheral surface of the screw shaft 1 is small, because the lip parts 120 can be warpped. No problem arises in this state.

In the fifth embodiment, the lubricant supply device 106 is engaged into the nut member 2, thus set screws are not required.

Next, a sixth embodiment of the invention will be discussed. Members identical with or similar to those previously described in the fourth embodiment are denoted by the same reference numerals in FIG. 19.

Figure 19:
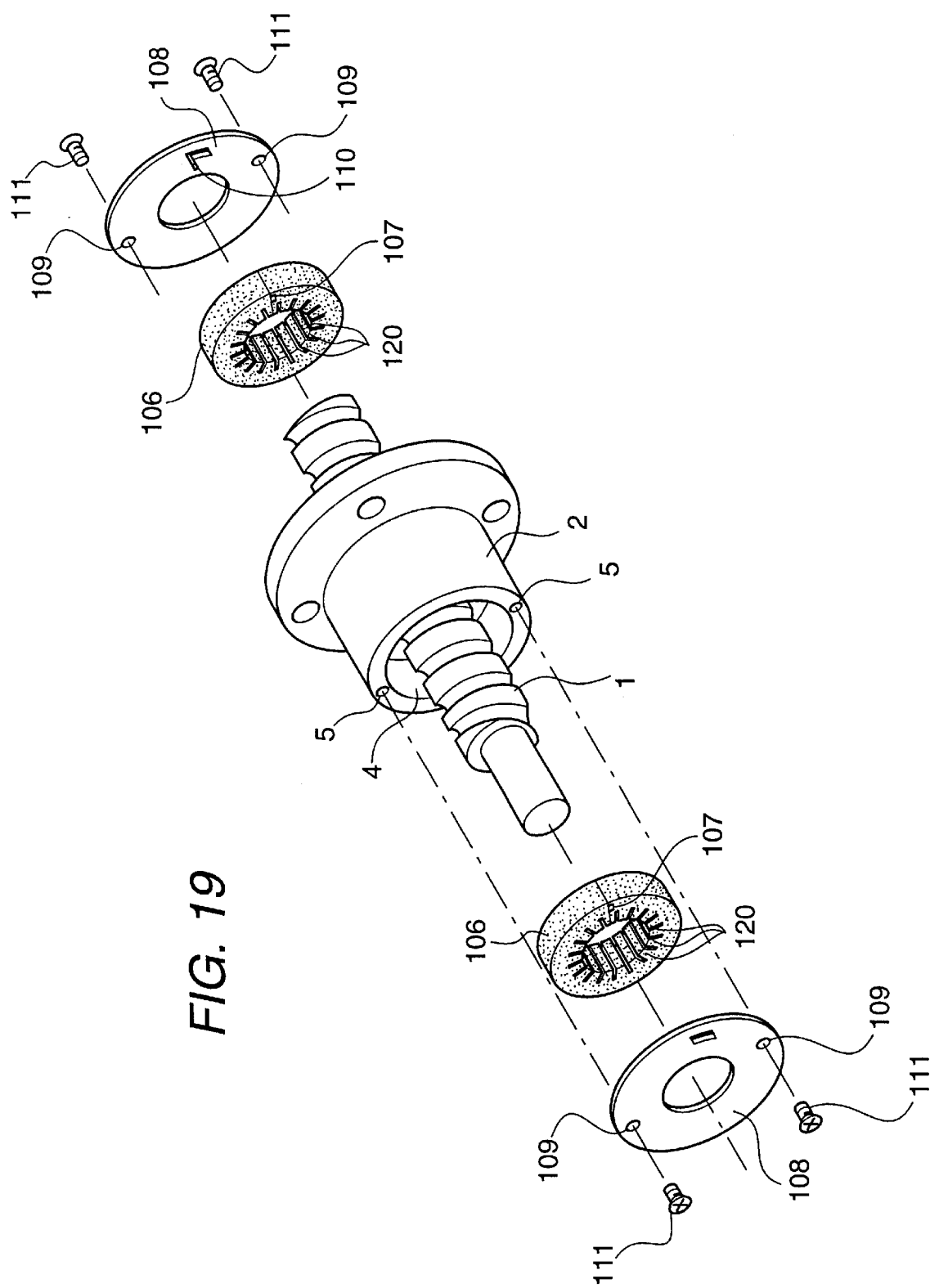
FIG. 19 is an exploded perspective view to show the main part of a ball screw according to a sixth embodiment of the invention.

The basic configuration of a ball screw of the sixth embodiment is similar to that of the fourth embodiment, as shown in FIG. 19.

However, a plurality of lip parts 120 are provided along the circumferential direction toward the inner peripheral surface of a lubricant supply device 106, so that pilot pressure F need not be given, reducing the number of projections 110 formed on a fixed ring 108 to one.

Other components and the function and effects of the fifth embodiment are similar to those of the above-described embodiment.

However, in order to balance mounting, a set of insertion hole 107 and projection 110 may also be made at points shifted 180 degrees in the circumferential direction.

Figure 20:
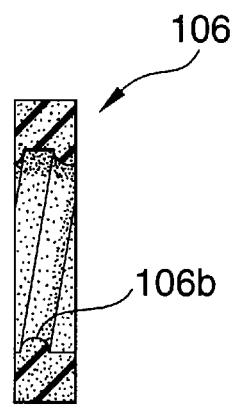
FIG. 20 is a sectional view to show another example of lubricant supply device.

The lubricant supply devices of these embodiments may have no projections on the inner peripheral surface or may be provided with a plurality of lip parts 20. However, the invention is not limited to them. For example, a spiral projection 106b that can be fitted into the thread groove 1 of the screw shaft 1 may be made on the inner peripheral surface of the lubricant supply device, as shown in FIG. 20.

Next, a seventh embodiment of the invention will be discussed. Members identical with or similar to those previously described in the fourth embodiment are denoted by the same reference numerals in FIG. 21.

Figure 21:
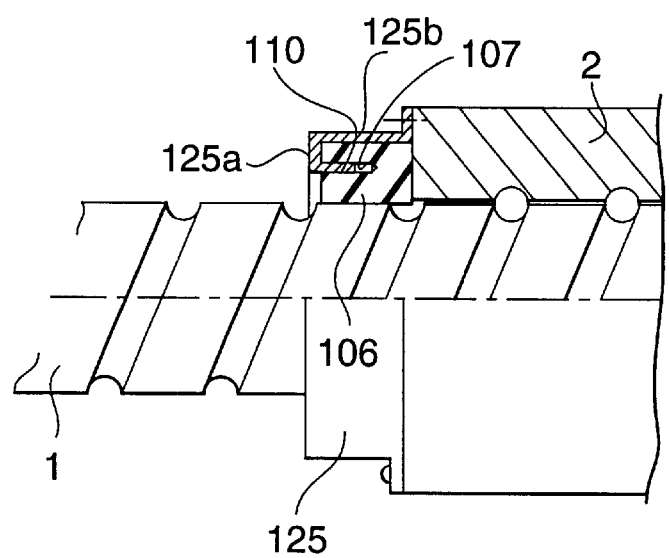
FIG. 21 is a sectional view to show the main part of a ball screw according to a seventh embodiment of the invention.

The basic configuration of a ball screw of the seventh embodiment is similar to that of the above-mentioned embodiment, as shown in FIG. 21.

However, without forming a nut member 2 with a recess 104, a cap-shaped press member 125 is formed and a lubricant supply device 106 is housed in the cap-shaped press member 125. At this time, a bottom 125a of the cap-shaped press member 125 is opposed axially to the axial opposed end face of the lubricant supply device 106.

Other components and the function and effects of the seventh embodiment are similar to those of the above-described embodiment. However, in the seventh embodiment, the nut member need not be formed with the recess 4.

Further, a projection 110 is made on the bottom 125a opposed axially to the lubricant supply device 106 as in the above-described embodiment, but the invention is not limited to it. For example, the projection 110 may be made on a circumferential wall portion 125b opposed to the lubricant supply device 106 in the circumferential direction 6.

In the embodiments, a part of the press member of the fixed ring, etc., is cut and the cut part is bent for forming the projection. However, the invention is not limited to it. For example, the projection may be formed by welding etc., on the face opposed to the lubricant supply device or a hole may be made in the press member and a bar-like member may be attached to the hole as a projection. However, if the projection is formed by cutting a part of the press member and bending the cut part as described above, it can be manufactured by press working easily and at low costs.

In the embodiments, the insertion holes are made in the lubricant supply device and the projections are inserted into the insertion holes. However, the invention is not limited to it. For example, without making the insertion holes in the lubricant supply device, it is possible to make the tips of the projections sharpen, in such a manner that the projections may be stuck into the lubricant supply device for insertion. At this time, in the case where pilot pressure in the circumferential direction is preferably put as load, the projections may be stuck into the lubricant supply device while the lubricant supply device is being warped in the circumferential direction.

In the embodiment, the lubricant supply device also serves as a seal member, but a separate seal member may be provided.

The lubricant supply device may be divided into parts along the circumferential direction. That is, the lubricant supply device may be like a ring as a whole. In this case, projections may be provided so as to connect the divisions or so as to correspond with the divisions.

Figure 22:
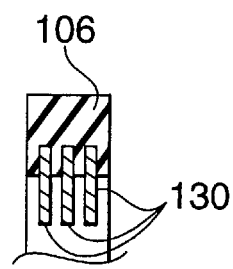
FIG. 22 is a sectional view to show an inner diameter part of another example of lubricant supply device.

Further, as shown in FIG. 22, the portion of the lubricant supply device coming in contact with the screw shaft 1 may be formed into a plurality of lip parts 30 axially arranged.

Next, an eighth embodiment of the invention will be discussed.

Figure 23:
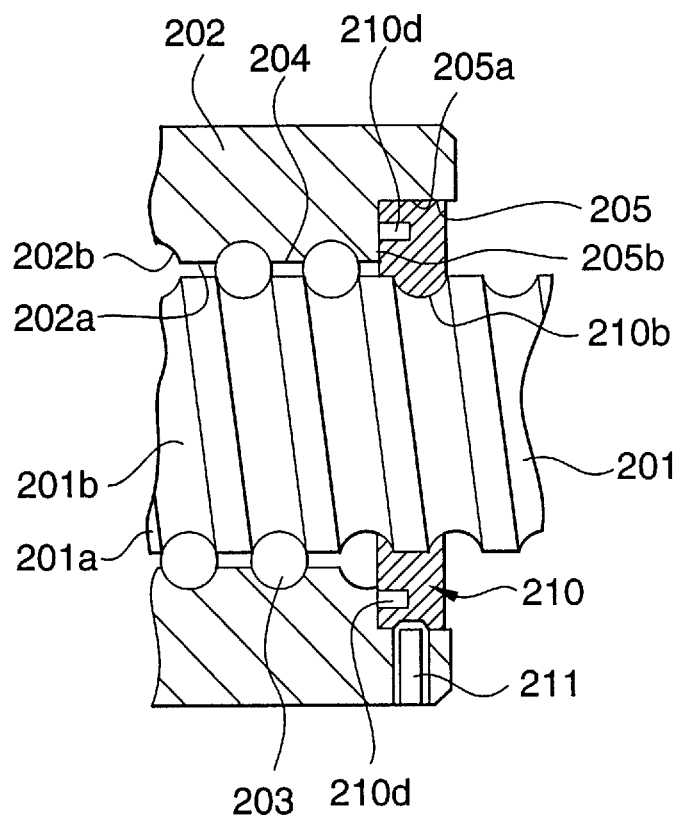
FIG. 23 is a sectional view to show the main part of a ball screw according to an eighth embodiment of the invention.

FIG. 23 is a sectional view to show the main part of a ball screw according to the eighth embodiment of the invention to show a specific structure of a feed screw device; the embodiment is applied particularly to a seal-type ball screw.

In the embodiment, a spiral thread groove 201b is formed in an outer peripheral surface 201a of a screw shaft 201 and a ball screw nut 202 is formed in an inner peripheral surface 202a with a thread groove 202b corresponding to the thread groove 201b. The ball screw nut 202 is threadably engaged into the screw shaft 201 with a large number of balls 203 disposed between the thread grooves 201b and 202b. Although not shown, a ball circulation section for guiding the balls 203 into the thread grooves 201b and 202b and rolling and circulating the balls is formed in the thick barrel portion of the ball screw.

Figure 24:
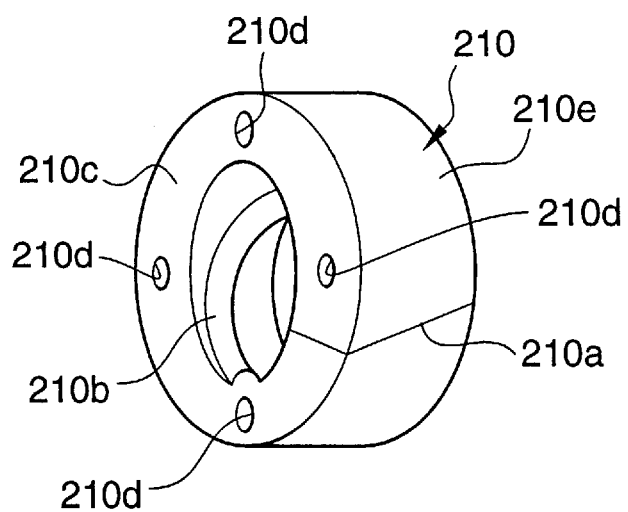
FIG. 24 is a perspective view to show a lubricant-containing polymer member used in the eighth embodiment of the invention.

The ball screw nut 202 is formed in an end face with an annular recess 205 into which a lubricant-containing polymer member 210 is fitted. The lubricant-containing polymer member 210 is an elastic member formed into a cylindrical shape, is provided with a cut part 210a along the substantially axial direction as shown in FIG. 24, and contains a lubricant such as grease or mineral oil.

The lubricant-containing polymer member 210 formed into a cylindrical shape is provided on an inner peripheral surface with a projection stripe 210b to be fitted into the thread groove 201b of the screw shaft 201 and formed in one end face 210c with a plurality of lubricant reserve holes 210d at positions distant from each other in the circumferential direction.

The lubricant reserve holes 210d are filled with a lubricant, an outer peripheral surface 210e of the lubricant-containing polymer member 210 is abutted against an inner peripheral surface 205a of the recess 205 made in an end face of the ball screw nut 202, and one end face 10c of the lubricant-containing polymer member 210 is abutted against a bottom face 205b of the recess 205. In this state, the projection stripe 210b is fitted into the thread groove 201b of the screw shaft 201, so that the lubricant-containing polymer member 210 is fitted into the recess 205, as shown in FIG. 23. The ball screw nut 202 is formed with a tapped hole extending diametrically inward from the outer peripheral surface and opened at the recess 205. As shown in FIG. 23, a set screw 211 is screwed into the tapped hole from the outer peripheral surface side, so that the lubricant-containing polymer member 210 is fixed to the ball screw nut 202.

Since the openings of the lubricant reserve holes 210d are closed on the bottom face 205b of the recess 205, the lubricant in the lubricant reserve holes 210d is sealed in the ball screw nut 202. The lubricant reserve holes 210d is one example of the structures of lubricant reserve parts according to the present invention.

According to the ball screw of the structure, when the screw shaft 201 makes relative rotation to the ball screw nut 202, the balls 203 in the ball screw nut 202 roll on a spiral space formed by the relative thread grooves 201a and 202a in the rotation direction of the screw shaft 201 and circulate through a ball circulation passage (not shown). As the balls 203 roll, the ball screw nut 202 is fed in the linear direction along the screw shaft 201. When the ball screw nut 202 and the screw shaft 201 make relative rotation, a lubricant exudes from the lubricant-containing polymer member 210 fitted into the recess 205, is supplied to the thread groove 201b of the screw shaft 201, and uniformly covers the balls 203 rolling in the thread groove 201b and the thread groove 202b of the ball screw nut for stable lubrication. Therefore, even if a lubricant is not supplied to the ball screw nut 202 from the outside, the ball screw can continue good running at low torque.

The lubricant-containing polymer member 210 also functions as a seal member for sealing the end of the ball screw nut 202 and shuts off the inside of the ball screw nut 202 from the external atmosphere. Thus, even if the feed screw device is used in the external atmosphere which is of a bad environment wherein for example wood chips, etc., easily absorbing lubricant are existed, the inside of the ball screw nut 202 is protected against the wood chips, etc., and the smooth lubrication effect can be maintained over a long time.

As a lubricant exudes from the lubricant-containing polymer member 210 and is consumed, the lubricant-containing polymer member 210 is replenished with the lubricant sealed in the lubricant reserve holes 210d, so that the simple structure enables the lubricant to be sealed in the lubricant-containing polymer member 210 and the lubricant exudes from the lubricant-containing polymer member 210 over a long time. Thus, the balls 203 rolling in the thread groove 201b and the thread groove 202b of the ball screw nut can be stably lubricated for a long time.

In the lubricant-containing polymer member 210, even if foreign materials such as wood chips are deposited on the lubricant-containing polymer member 210 and absorb the lubricant, the lubricant-containing polymer member 210 is replenished with a lubricant from the lubricant reserve holes 210d. Accordingly, it is not feared that a lubrication failure will be invited.

Figure 25:
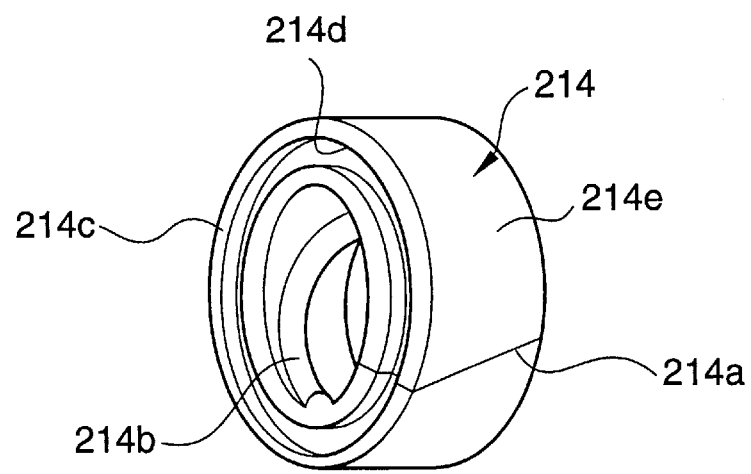
FIG. 25 is a perspective view to show a modified example of the lubricant-containing polymer member shown in FIG. 24.

FIG. 25 shows a modified example of the lubricant-containing polymer member 210 of the eighth embodiment shown in FIG. 24.

A modified example lubricant-containing polymer member 214 is also an elastic member formed like a cylindrical shape and having a cut part 214a along the substantially axial direction, and contains a lubricant such as grease or mineral oil by a molding method similar to that of the lubricant-containing polymer member 210.

The lubricant-containing polymer member 214 is formed on an inner peripheral surface with a projection stripe 214b to be fitted into the thread groove 201b of the screw shaft 201, and the lubricant-containing polymer member 214 is formed in one end face 214c with a lubricant reserve peripheral groove 214d continuously extending in the circumferential direction.

The lubricant reserve peripheral groove 214d is filled with a lubricant. An outer peripheral surface 214e of the lubricant-containing polymer member 214 is abutted against an inner peripheral surface 205a of the recess 205 made in an end face of the ball screw nut 202. One end face 214c of the lubricant-containing polymer member 214 is abutted against a bottom face 205b of the recess 205. In this state, the projection stripe 214b is fitted into the thread groove 201b of the screw shaft 201, so that the lubricant-containing polymer member 214 is fitted into the recess 205. The lubricant-containing polymer member 214 is fixed to the ball screw nut 202 by the set screw 211 shown in FIG. 23.

Since the groove opening of the lubricant reserve peripheral groove 214d made in the one end face 214c is closed on the bottom face 205b of the recess 205, the lubricant in the lubricant reserve peripheral groove 214d is sealed in the ball screw nut 202. This lubricant reserve peripheral groove 214d is one example of structure of the lubricant reserve part according to the present invention.

The lubricant-containing polymer member 214 also functions as a seal member for sealing the end of the ball screw nut 202 and shuts off the inside of the ball screw nut 202 from the external atmosphere. Thus, even if the feed screw device is used in the external atmosphere which is of a bad environment wherein wood chips, etc., easily absorbing lubricant are existed, the inside of the ball screw nut 202 is protected against such bad environment, so that the smooth lubrication effect can be maintained over a long time.

As a lubricant exudes from the lubricant-containing polymer member 214 and is consumed, the lubricant-containing polymer member 214 is replenished with the lubricant sealed in the lubricant reserve peripheral groove 214d, so that the lubricant exudes from the lubricant-containing polymer member 214 over a long time. Thus, the balls 203 rolling in the thread groove 201b and the thread groove 202b of the ball screw nut can be stably lubricated for a long time.

Even if foreign materials such as wood chips are deposited on the lubricant-containing polymer member 214 and absorb the lubricant, the lubricant-containing polymer member 214 is replenished with a lubricant from the lubricant reserve peripheral groove 214d, thus it is not feared that a lubrication failure will be invited.

Figure 26:
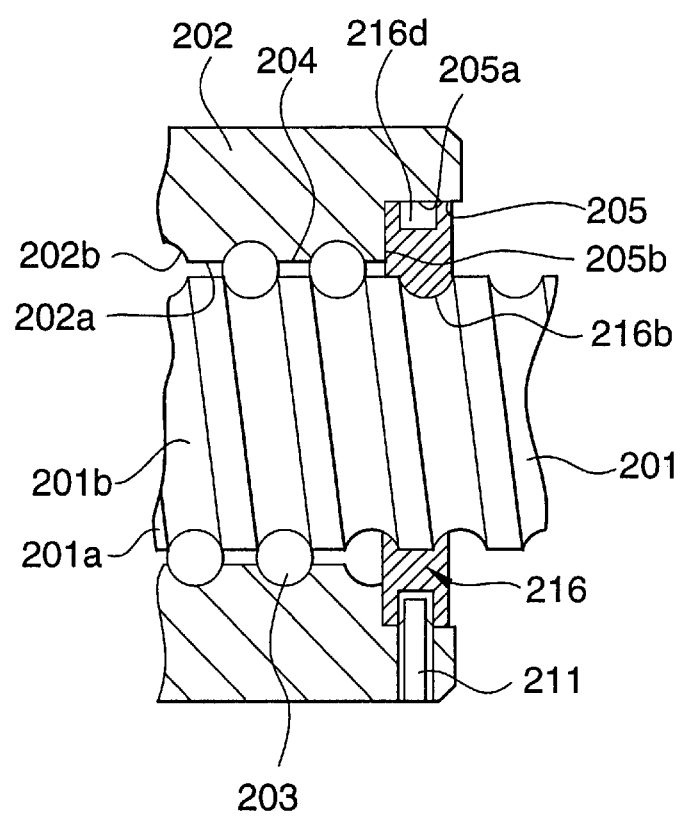
FIG. 26 is a sectional view to show the main part of a ball screw according to a ninth embodiment of the invention.
Figure 27:
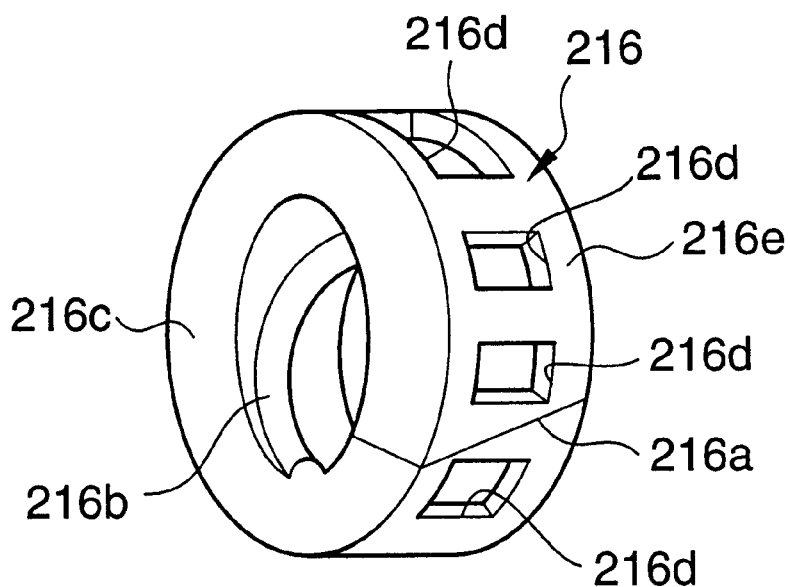
FIG. 27 is a perspective view to show a lubricant-containing polymer member used in the ninth embodiment of the invention.

FIG. 26 is a sectional view to show the main part of a ball screw according to a ninth embodiment of the invention. FIG. 27 is a perspective view to show a lubricant-containing polymer member used in the ninth embodiment. Components identical with those previously described with reference to FIGS. 23 to 25 in the eighth embodiment are denoted by the same reference numerals in FIGS. 26 and 27 and will not be discussed again.

In the ninth embodiment, a lubricant-containing polymer member 216 fitted into an annular recess 205 is an elastic member formed into a cylindrical shape and having a cut part 216a along the substantially axial direction, as shown in FIG. 27, and contains a lubricant such as grease or mineral oil as in the eighth embodiment. The lubricant-containing polymer member 216 is formed on an inner peripheral surface with a projection stripe 216b fitted into a thread groove 201b of a screw shaft 201 and formed in an outer peripheral surface 216e with a plurality of lubricant reserve holes 216d at positions distant from each other in the circumferential direction.

The lubricant reserve holes 216d are filled with a lubricant, the outer peripheral surface 216e of the lubricant-containing polymer member 216 is abutted against an inner peripheral surface 205a of the recess 205 made in a ball screw nut 202, and one end face 216c of the lubricant-containing polymer member 216 is abutted against a bottom face 205b of the recess 205. In this state, the projection stripe 216b is fitted into the thread groove 201b of the screw shaft 201, so that the lubricant-containing polymer member 216 is fitted into the recess 205, as shown in FIG. 26. Set screws 211 are screwed into tapped holes made toward the recess 205 of the ball screw nut 202, so that the tips of the set screws 211 are engaged into the lubricant reserve holes 216d for fixing the lubricant-containing polymer member 216 to the ball screw nut 202.

Since the openings of the lubricant reserve holes 216d are closed on the inner peripheral surface 205a of the recess 205, the lubricant in the lubricant reserve holes 216d is sealed in the ball screw nut 202. The lubricant reserve holes 216d is one example of structure of the lubricant reserve part according to the present invention.

According to the ball screw of the structure, when the screw shaft 201 makes relative rotation to the ball screw nut 202, the balls 203 in the ball screw nut 202 roll on a spiral space formed by the relative thread grooves 201a and 202a in the rotation direction of the screw shaft 201 and circulate through a ball circulation passage (not shown). As the balls 203 roll, the ball screw nut 202 is fed in the linear direction along the screw shaft 201. When the ball screw nut 202 rotates, a lubricant exudes from the lubricant-containing polymer member 216 fitted into the recess 205, is supplied to the thread groove 201b of the screw shaft 201, and uniformly covers the balls 203 rolling in the thread groove 201b and the thread groove 202b of the ball screw nut for stable lubrication. Therefore, even if a lubricant is not supplied to the ball screw nut 202 from the outside, the ball screw can continue good running at low torque.

The lubricant-containing polymer 216 also functions as a seal member for sealing the end of the ball screw nut 202 and shuts off the inside of the ball screw nut 202 from the external atmosphere. Thus, even if the feed screw device is used in the external atmosphere which is of a bad environment wherein for example wood chips, etc., easily absorbing lubricant are existed, the inside of the ball screw nut 202 is protected against the wood chips, etc., and the smooth lubrication effect can be maintained over a long time.

As a lubricant exudes from the lubricant-containing polymer member 216 and is consumed, the lubricant-containing polymer member 216 is replenished with the lubricant sealed in the lubricant reserve holes 216d, so that the lubricant exudes from the lubricant-containing polymer member 216 over a long time. Thus, the balls 203 rolling in the thread groove 201b and the thread groove 202b of the ball screw nut can be stably lubricated for a long time.

Even if foreign materials such as wood chips are deposited on the lubricant-containing polymer member 216 and absorb the lubricant, the lubricant-containing polymer member 216 is replenished with a lubricant from the lubricant reserve holes 216d, thus it is not feared that a lubrication failure will be invited.

Figure 28:
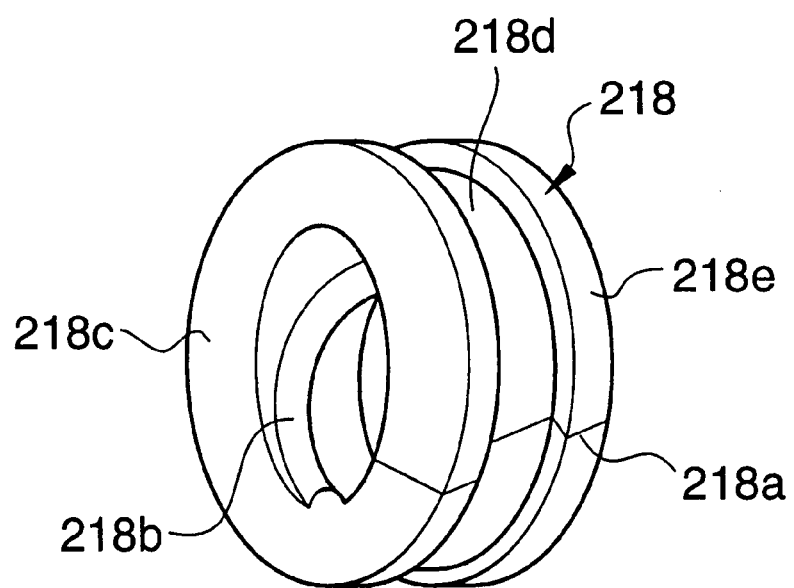
FIG. 28 is a perspective view to show a modified example of the lubricant-containing polymer member shown in FIG. 27.

FIG. 28 shows a modified example of the lubricant-containing polymer member 216 of the ninth embodiment shown in FIG. 27.

A modified example lubricant-containing polymer member 218 is also an elastic member formed into a cylindrical shape and having a cut part 218a along the substantially axial direction, and contains a lubricant such as grease or mineral oil by a molding method similar to that of the lubricant-containing polymer member 216.

The lubricant-containing polymer member 218 is formed on an inner peripheral surface with a projection stripe 218b fitted into the thread groove 201b of the screw shaft 201 and formed in an outer peripheral surface 218e with a lubricant reserve peripheral groove 218d continuous in the circumferential direction.

As similar to the lubricant reserve peripheral groove 216d shown in FIG. 26, the lubricant reserve peripheral groove 218d is filled with a lubricant, an outer peripheral surface 218e of the lubricant-containing polymer member 218 is abutted against an inner peripheral surface 205a of the recess 205 made in the ball screw nut 202, and one end face 218c of the lubricant-containing polymer member 218 is abutted against a bottom face 205b of the recess 205. In this state, the projection stripe 218b is fitted into the thread groove 201b of the screw shaft 201, so that the lubricant-containing polymer member 218 is fitted into the recess 205. A set screw 211 is screwed into the lubricant reserve peripheral groove 218d for fixing the lubricant-containing polymer member 218 to the ball screw nut 202.

Since the groove opening of the lubricant reserve peripheral groove 218d made in the outer peripheral surface 218e of the lubricant-containing polymer member 218 is closed on the inner peripheral surface 205a of the recess 205, the lubricant in the lubricant reserve peripheral groove 218d is sealed in the ball screw nut 202. The lubricant reserve peripheral groove 218d is one example of the structures of lubricant reserve part according to the present invention.

The lubricant-containing polymer member of the structure can provide the function and effects similar to those of the above-described embodiment.

Even if foreign materials such as wood chips are deposited on the lubricant-containing polymer member 218 and absorb the lubricant, the lubricant-containing polymer member 218 is replenished with a lubricant from the lubricant reserve holes 218d, thus it is not feared that a lubrication failure will be invited.

Figure 29:
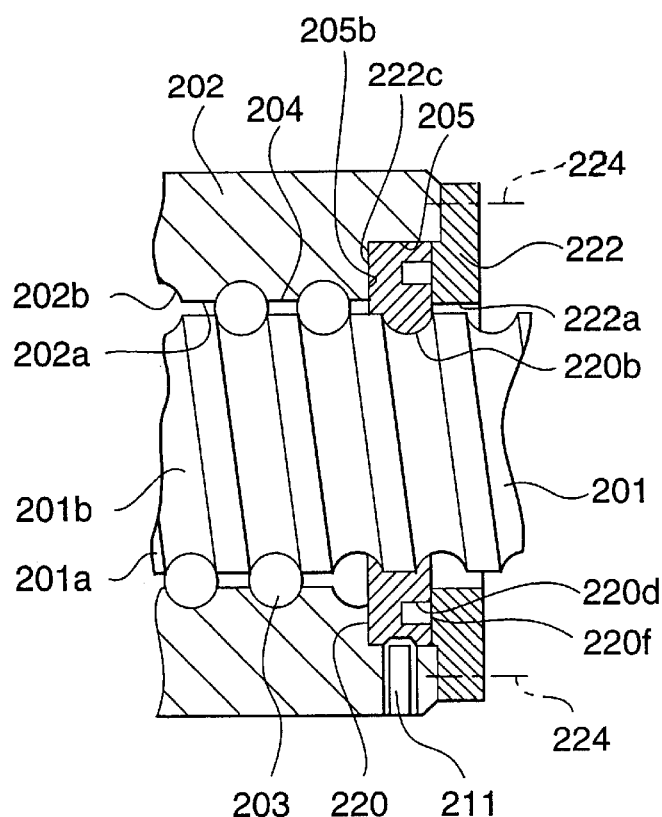
FIG. 29 is a sectional view to show the main part of a ball screw according to a tenth embodiment of the invention.

FIG. 29 is a sectional view to show the main part of a ball screw according to a tenth embodiment of the invention. Components identical with those previously described with reference to FIGS. 23 to 25 in the eighth embodiment are denoted by the same reference numerals in FIG. 29 and will not be discussed again.

In the tenth embodiment, a lubricant-containing polymer member 220 is fitted into an annular recess 205. The lubricant-containing polymer member 220 has the same structure as the lubricant-containing polymer member 210 shown in FIG. 24 except that it is formed with a plurality of lubricant reserve holes 220d filled with a lubricant in the circumferential direction of an opposed end face 220f. The right opening of the lubricant-containing polymer member 220 (in FIG. 29) is sealed by a reinforcing plate 222.

The reinforcing plate 222 is a disk member made of a material of a steel plate, hard rubber, plastic plate, etc., and formed with an insertion hole 222a for a screw shaft 201 at the position of the center of axle. It has an outer peripheral diameter set slightly smaller than the outer peripheral diameter of the end face of a ball screw nut 202, and the insertion hole 222a is set slightly larger than the outer diameter of the screw shaft 201. While pressing the lubricant-containing polymer member 220 against a bottom face 205b of the recess 205, the reinforcing plate 222 is fixed to the ball screw nut 202 by set screws 224 indicated by alternate long and short dash lines in FIG. 29.

Since the openings of the lubricant reserve holes 222d are closed on the reinforcing plate 222, the lubricant in the lubricant reserve holes 222d is sealed in the reinforcing plate 222 integral with the ball screw nut 202. The lubricant reserve holes 222d is one example of the structures of lubricant reserve parts according to the present invention.

The lubricant-containing polymer member of the structure can provide the function and effects similar to those of the above-described embodiment.

As the effect proper to the embodiment, the lubricant-containing polymer member 220 is shut off from the external atmosphere by the reinforcing plate 222, so that wood chips, dust, etc., can be prevented from entering the lubricant-containing polymer member 220; it is not feared that the lubricant is absorbed into wood chips, dust, etc., from the portion.

Since the lubricant-containing polymer member 220 is held down by the reinforcing plate 222 from the opening of the recess 205 (right in FIG. 29), an adhesion problem need not be considered. The lubricant-containing polymer member 220 can be adjusted in hardness and insufficient strength by press pressure received from the reinforcing plate 222, thus breakage, cracks, etc., can be prevented from occurring.

Further, in the embodiment, if the lubricant sealed in the lubricant reserve holes 222d becomes insufficient, the lubricant reserve holes 222d can be easily replenished with a lubricant simply by loosening the set screws 224 and removing the reinforcing plate 222 from the ball screw nut 222.

The embodiment uses the lubricant-containing polymer member 220 formed in the opposed end face 220f with a plurality of lubricant reserve holes 220d. However, if a lubricant-containing polymer member 220 formed in the opposed end face 220f with a lubricant reserve peripheral groove continuous in the circumferential direction (member similar to the lubricant-containing polymer member 214 shown in FIG. 25) is used, the function and effects similar to those of the embodiment can be provided.

Figure 30:
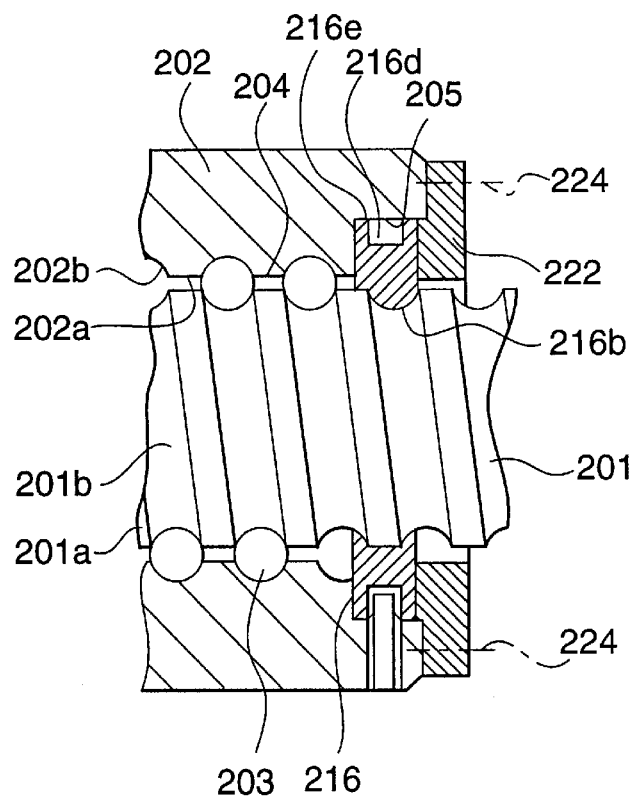
FIG. 30 is a sectional view to show the main part of a ball screw according to an eleventh embodiment of the invention.

FIG. 30 is a sectional view to show the main part of a ball screw according to an eleventh embodiment of the invention.

In the embodiment, the lubricant-containing polymer member 216 formed in the outer peripheral surface 216e with a plurality of lubricant reserve holes 216d shown in FIG. 27 is fitted into an annular recess 205, and the right opening of the lubricant-containing polymer member 216 (in FIG. 30) is sealed by a reinforcing plate 222.

The lubricant-containing polymer member of the structure can provide the function and effects similar to those of the above-described embodiment.

The embodiment uses the lubricant-containing polymer member 216 formed in the outer peripheral surface 216e with a plurality of lubricant reserve holes 216d. However, if the lubricant-containing polymer member 218 shown in FIG. 28, namely, member formed in the outer peripheral surface 218e with the lubricant reserve peripheral groove 218d is used, the function and effects similar to those of the embodiment can be provided.

Figure 31:
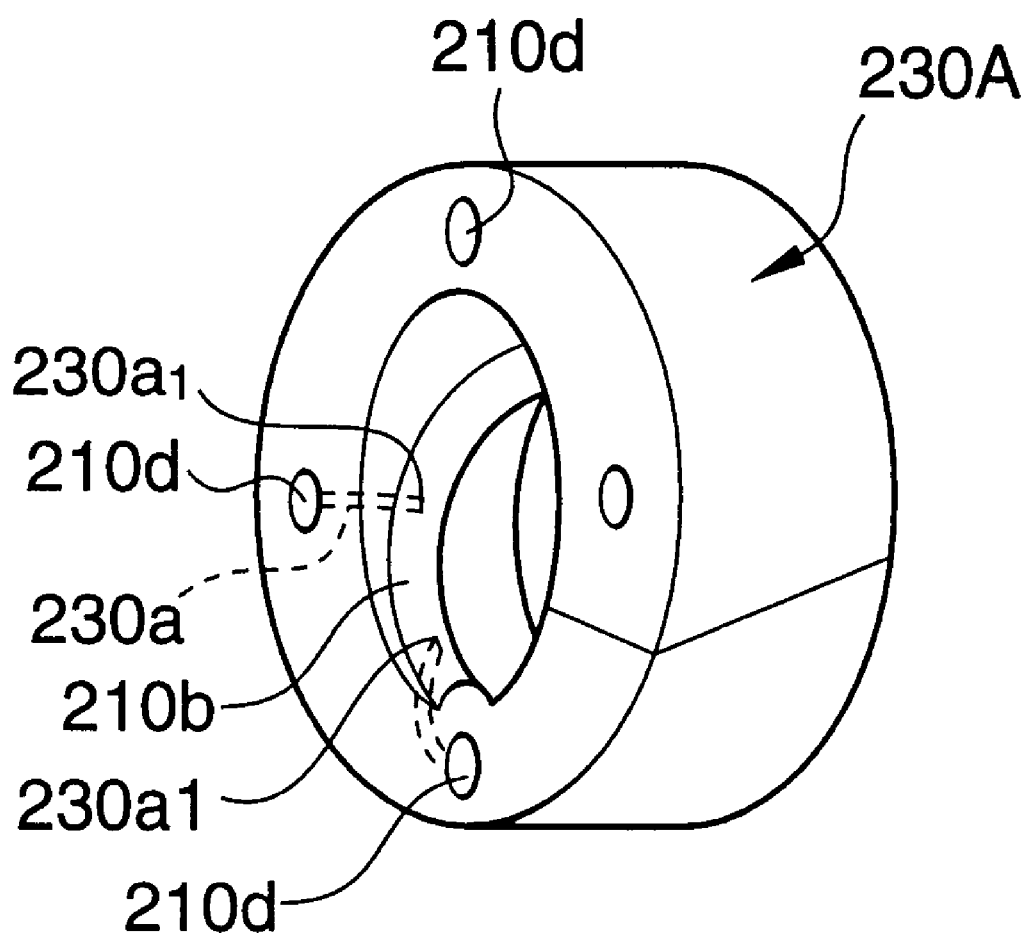
FIG. 31 is an illustration to show a first modified example of a lubricant-containing polymer member formed with communication holes according to the invention.
Figure 32:
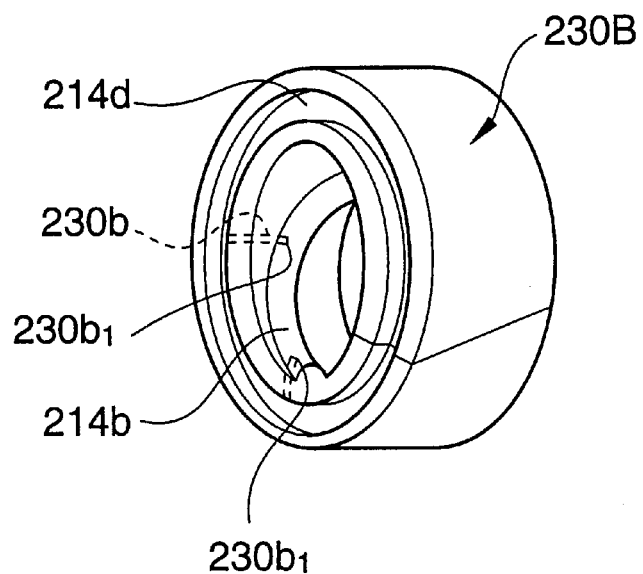
FIG. 32 is an illustration to show a first modified example of a lubricant-containing polymer member formed with communication holes according to the invention.
Figure 33:
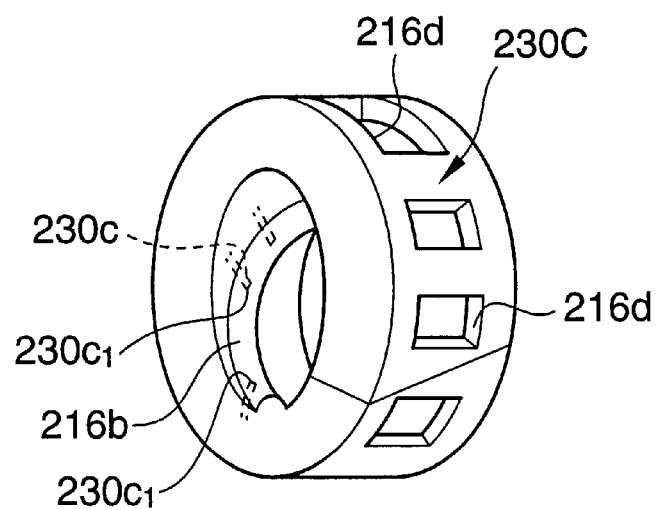
FIG. 33 is an illustration to show a first modified example of a lubricant-containing polymer member formed with communication holes according to the invention.

Lubricant-containing polymer members 230A, 230B, and 230C shown in FIGS. 31 to 33 are modified examples of the lubricant-containing polymer members 210, 214, and 216 respectively shown in FIGS. 24 and 25 to 27.

The lubricant-containing polymer member 230A, 230B, 230C is formed with microscopic communication holes 230a, 230b, 230c for communicating lubricant reserve holes 210d and a projection stripe 210b, a lubricant reserve peripheral groove 214d and a projection stripe 214b, lubricant reserve holes 216d and a projection stripe 216b. Slit-like or smallhole-like outflow openings 230a1, 230b1, 230c1 are made in the projection stripe 210b, 214b, 216b.

With a ball screw using the lubricant-containing polymer member 230A of the structure, a lubricant sealed in the lubricant reserve holes 210d flows out directly into the outflow opening 230a1 through the communication hole 230a. Thus, if much lubricant is required to provide stable lubrication, the lubricant-containing polymer member 230A becomes an optimum member. With another lubricant-containing polymer member 230B (230C), a lubricant sealed in the lubricant reserve peripheral groove 214d (lubricant reserve holes 216d) flows out directly into the outflow opening 230b1 (230c1) through the communication hole 230b (230c). Thus, similar effects to those of the lubricant-containing polymer member 230A can be provided.

Figure 34:
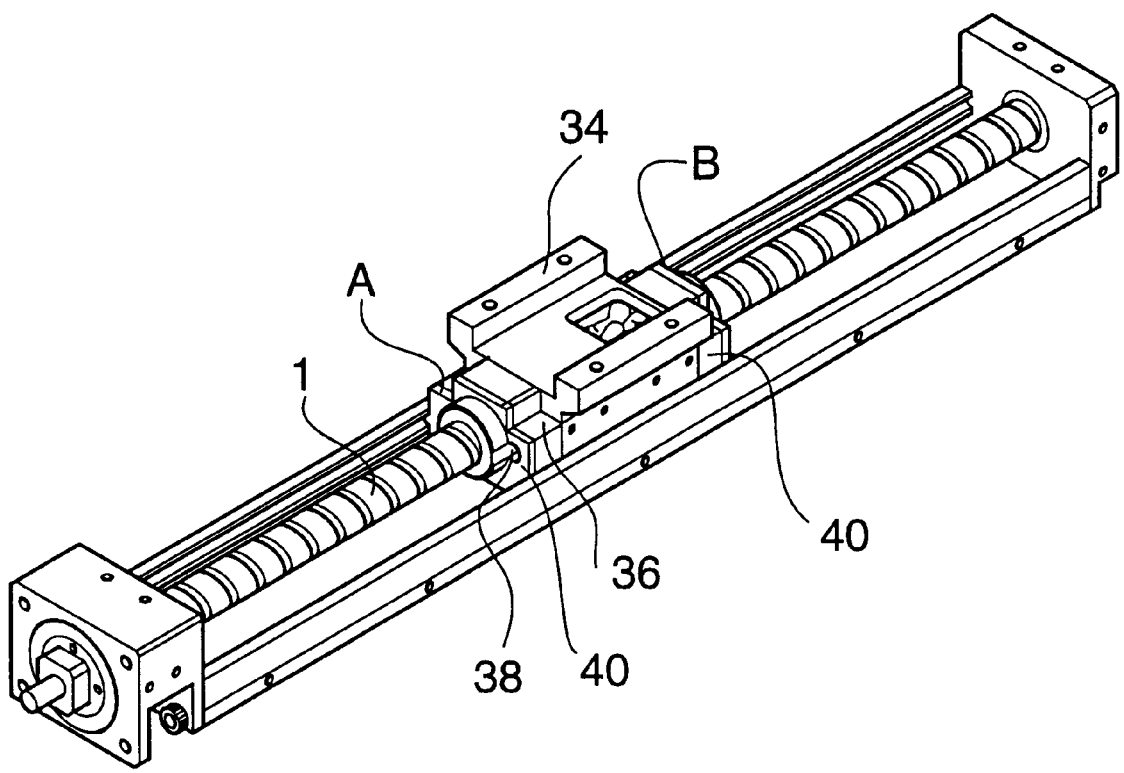
FIG. 34 is a perspective view to show application of the invention to a single axis actuator.

FIG. 34 shows a single axis actuator comprising the ball screws of the embodiments. The single axis actuator comprises a ball screw nut (not shown) in a slider 34 disposed for relative rotation via balls in a screw shaft 1 having both ends supported for rotation. Reference numeral 36 is a ball circulation section for guiding a large number of balls into thread grooves of the screw shaft 1 and the ball screw nut and circulating the balls. A lubricant-containing polymer member 40 to which a reinforcing plate is attached, fixed by a set screw 38 is disposed at position A outside the ball circulation section 36. A lubricant-containing polymer member 40 to which a reinforcing plate is attached is also disposed at position B facing position A with the slider 34.

Figure 35:
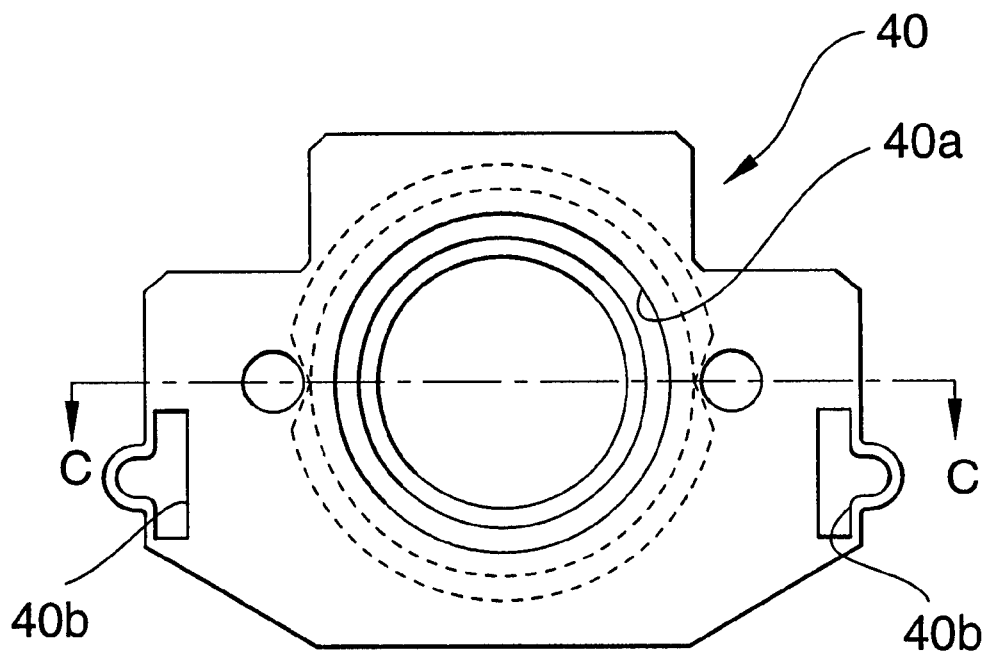
FIG. 35 is a front view to show a lubricant-containing polymer member used with the single axis actuator in FIG. 34.
Figure 36:
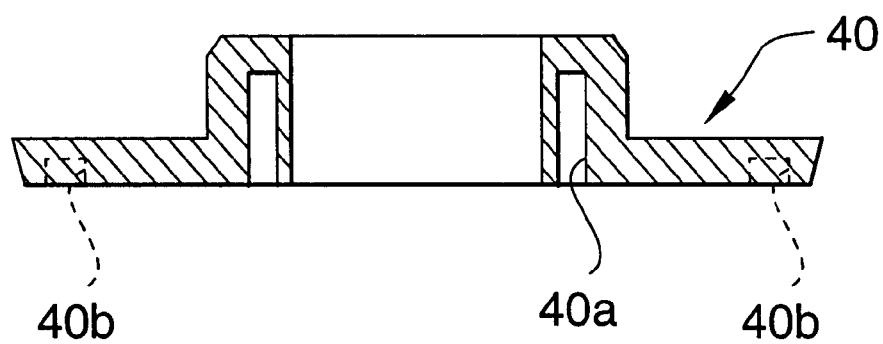
FIG. 36 is a sectional view taken on line C—C in FIG. 35.

FIGS. 35 and 36 show the lubricant-containing polymer member 40 used with the single axis actuator. The lubricant-containing polymer member 40 is formed with a lubricant reserve peripheral groove 40a similar to that of the member, for example, shown in FIG. 25 and lubricant reserve holes 40b similar to those of the member, for example, shown in FIG. 24 at positions distant from the lubricant reserve peripheral groove 40a. The lubricant reserve peripheral groove 40a and the lubricant reserve holes 40b are filled with a lubricant. As the lubricant exudes from the lubricant-containing polymer member 40 and is consumed, the lubricant reserve peripheral groove 40a and the lubricant reserve holes 40b are replenished with a lubricant.

If the lubricant-containing polymer member 40 comprises the lubricant reserve peripheral groove 40a and the lubricant reserve holes 40b as lubricant reserve parts as described above, the invention can also produce the function and effects similar to those of the embodiments.

In the embodiments, we have discussed the ball screws, but the invention is not limited to them; if the invention is applied to slide screws adopting angular screws, etc., similar function and effects can be provided.

Next, a modified example of the lubricant-containing polymer member 230C shown in FIG. 33 will be discussed with reference to FIG. 37.

Figure 37:
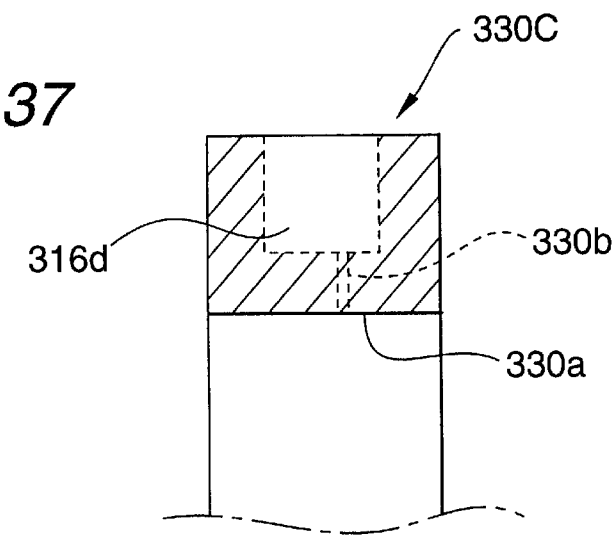
FIG. 37 is a sectional view of the main part of a modified example of lubricant-containing polymer member according to the invention.

As shown in FIG. 37, a lubricant-containing polymer member 330C has the same structure as the lubricant-containing polymer member 230C except that it is not formed with the projection stripe 216b. An inner peripheral surface 330a of the lubricant-containing polymer member 330C comes in direct contact with the outer peripheral surface 201a of the screw shaft 201, so that a lubricant exudes onto the outer peripheral surface 201a gradually with rotation of the screw shaft. The lubricant-containing polymer member 330C is formed with a microscopic communication hole 330b for communicating a lubricant reserve groove 316d and the inner peripheral surface 330a. A lubricant is supplied from the lubricant reserve groove 316d directly to the outer peripheral surface 201a of the screw shaft 201 through the communication hole 330b. As the lubricant is directly supplied, more stable lubrication is provided.

Further, a modified example of the lubricant-containing polymer member 230B shown in FIG. 32 will be discussed with reference to FIG. 38.

Figure 38:
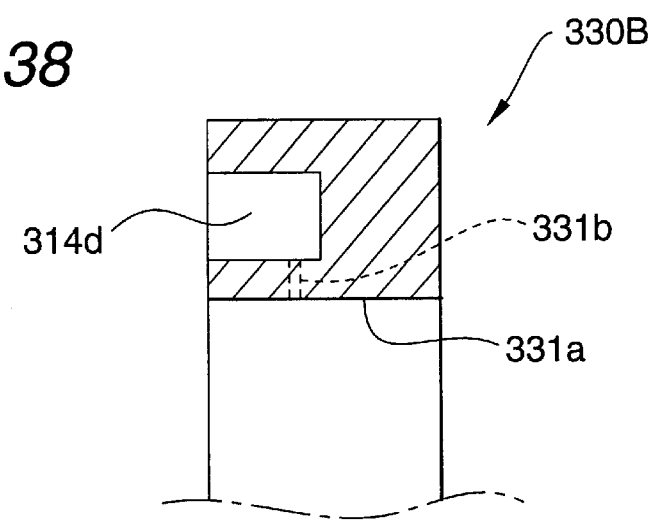
FIG. 38 is a sectional view of the main part of a modified example of lubricant-containing polymer member according to the invention.

As shown in FIG. 38, a lubricant-containing polymer member 330B has the same structure as the lubricant-containing polymer member 230C except that it is not formed with the projection stripe 214b. An inner peripheral surface 331a of the lubricant-containing polymer member 330B comes in direct contact with the outer peripheral surface 201a of the screw shaft 201, so that a lubricant exudes onto the outer peripheral surface 201a gradually with rotation of the screw shaft. The lubricant-containing polymer member 330B is formed with a microscopic communication hole 331b for communicating a lubricant reserve peripheral groove 314d and the inner peripheral surface 330a. A lubricant is supplied from the lubricant reserve peripheral groove 314d directly to the outer peripheral surface 201a of the screw shaft 201 through the communication hole 330b. As the lubricant is directly supplied, more stable lubrication is provided.

Further, a modified example of the lubricant-containing polymer member 230B shown in FIG. 32 will be discussed with reference to FIG. 39.

Figure 39:
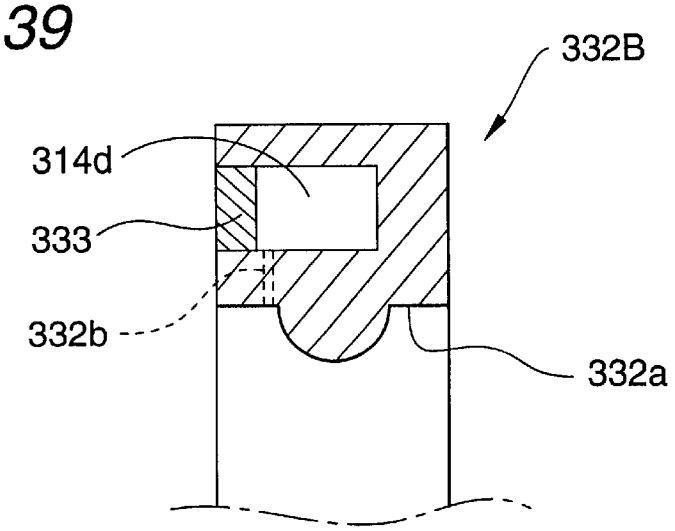
FIG. 39 is a sectional view of the main part of a modified example of lubricant-containing polymer member according to the invention.

As shown in FIG. 39, a lubricant-containing polymer member 332B has the same structure as the lubricant-containing polymer member 230C except that it comprises a seal member 333 fitted into the opening of the lubricant reserve peripheral groove 214d for sealing a lubricant. The seal member 333 is made of the same material as the lubricant-containing polymer member 332B. Alternatively, the seal member 333 may be made of a plastic or metal.

Next, a modified example of the lubricant-containing polymer member 230B shown in FIG. 32 will be discussed with reference to FIG. 40.

Figure 40:
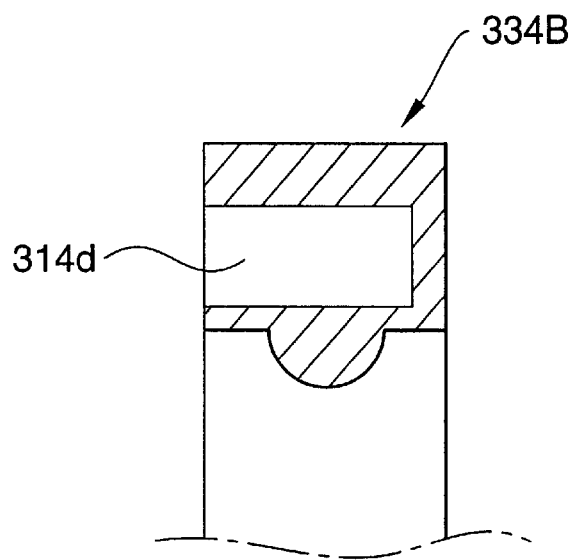
FIG. 40 is a sectional view of the main part of a modified example of lubricant-containing polymer member according to the invention.

As shown in FIG. 40, a lubricant-containing polymer member 334B has the same structure as the lubricant-containing polymer member 230B except for the placement position of the lubricant reserve peripheral groove 314d. The lubricant-containing polymer member 334B has a lubricant reserve peripheral groove 314d pulled to the side of the outer peripheral surface 201a of the screw shaft 201, that is, the lubricant-containing polymer member 334B has the lubricant reserve peripheral groove 314d which is shifted to the diametric inside as much as possible for increasing elasticity, so that a lubricant easily exudes from the lubricant reserve peripheral groove 314d and is easily supplied to the outer peripheral surface 201a of the screw shaft 201.

Further, a modified example of the lubricant-containing polymer member 330C shown in FIG. 37 will be discussed with reference to FIG. 41.

Figure 41:
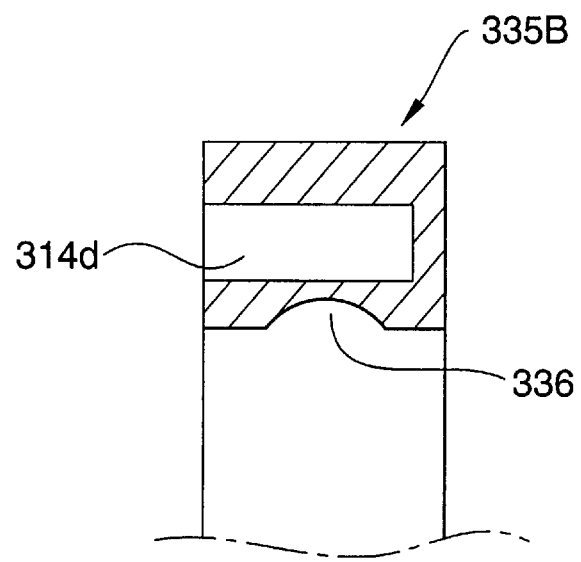
FIG. 41 is a sectional view of the main part of a modified example of lubricant-containing polymer member according to the invention.

As shown in FIG. 41, a lubricant-containing polymer member 335B has the same structure as the lubricant-containing polymer member 330C except that a groove 336 extending in the circumferential direction is made in an inner peripheral surface 330a. Since the groove 336 extending in the circumferential direction is made in the inner peripheral surface 330a, the lubricant-containing polymer member 335B has the inner peripheral thinner than the outer periphery and a lubricant sealed in a lubricant reserve peripheral groove 314d exudes to the inner periphery more easily than to the outer periphery and thus is easily supplied to the outer peripheral surface 201a of the screw shaft 201.

As we have discussed, when the feed screw device of the invention is driven, a lubricant in the lubricant supply device exudes gradually with rotation of the screw shaft and is automatically supplied to the feed screw device. Resultantly, even if a lubricant is not supplied from the outside, the feed screw device can continue good running for a long time at low torque.

Particularly, since a lubricant need not be supplied from the outside, the feed screw device can be used as effective lubrication means in a system that can use only an extremely small amount of lubricant, such as a semiconductor manufacturing system.

Moreover, in the feed screw device of the invention, the inner peripheral surface of the lubricant supply device can be brought into reliable contact with the outer peripheral surface of the screw shaft by simple means and the outer diameter of the feed screw device is not made large.

Moreover, in the feed screw device of the invention, jump out of the lubricant supply device from the nut member and rotation with the screw shaft can be prevented.

In the screw transmission device of the invention, the inner diameter of the lubricant supply device is reduced by simple means for uniform contact with the screw shaft; a lubricant can be supplied well and wear on one side can be prevented.

As we have discussed, according to the feed screw device of the invention, the lubricant-containing polymer member seals both the ends of the screw nut and shuts off the inside of the screw nut from the external atmosphere, so that even if the feed screw device is used in the external atmosphere which is of a bad environment wherein for example, wood chips, etc., easily absorbing lubricant are existed, the inside of the screw nut is protected against the wood chips, etc., and the smooth lubrication effect can be maintained a over a long time.

As a lubricant exudes from the lubricant-containing polymer member and is consumed, the lubricant-containing polymer member is replenished with a new lubricant sealed in the lubricant reserve parts, thus the lubricant exudes from the lubricant-containing polymer member over a long time and stable lubrication can be carried out for a long time.

Further, even if foreign materials such as wood chips are deposited on the lubricant-containing polymer member and absorb the lubricant, the lubricant-containing polymer member is replenished with a lubricant from the lubricant reserve parts, thus it is not feared that a lubrication failure will be invited.

What is claimed is:

1. A feed screw device comprising:
   a screw shaft;
   a nut member threadably engaging an outer periphery of said screw shaft;
   a ring shaped lubricant supply device having an inner periphery surface and an outer periphery surface wherein said lubricant supply device is fixed to said nut member, said lubricant supply device coming in contact with the outer periphery of said screw shaft, said lubricant supply device having a predetermined elasticity, said lubricant supply device having a cutting portion extending through said lubricant supply device from the inner periphery surface of said lubricant supply device to the outer periphery surface of said lubricant supply device; and
   a deforming member which deforms at least the outer periphery of said lubricant supply device in the circumferential direction and the inner periphery of said lubricant supply device to press the inner periphery of said lubricant supply device against an outer periphery of said screw shaft,
   wherein at least a portion of said lubricant supply device facing said screw shaft is made of rubber or synthetic resin containing a lubricant.

2. The feed screw device according to claim 1, in which said deforming member comprises:
   a notch formed in the outer periphery side of the lubricant supply device; and
   an expansion member inserted into said notch for deforming said lubricant supply device in the circumferential direction.

3. The feed screw device according to claim 1, in which said nut member is provided with a recess portion for attaching said lubricant supply device and a retaining ring for retaining said lubricant supply device within said recess portion.

4. The feed screw device according to claim 3, in which said retaining ring is provided with a recess into which a part of said deforming member is inserted.

5. The feed screw device according to claim 1, in which said lubricant supply device is provided on an inner peripheral surface thereof with a projection which is fitted into a thread groove formed on the outer perpheral surface of screw shaft.

6. The feed screw device according to claim 1, in which said nut member is provided with a cap-shaped retaining ring which has a recessing portion for accommodating said lubricant supply device.

7. The feed screw device according to claim 3, in which said deforming member comprises:
   a notch formed in the outer periphery side of the lubricant supply device; and
   an expansion member formed on said retying ring and inserted into said notch so as to deform said lubricant supply device in the circumferential direction.

8. The feed screw device according to claim 1, in which said lubricant supply device is provided with a plurality of lip parts projected along the circumferential direction toward the inner peripheral surface of said lubricant supply device and come in sliding contact with the outer peripheral surface of said screw shaft.

9. The feed screw device according to claim 1, wherein said lubricant comprises at least one of grease and mineral oil.

10. The feed screw device according to claim 2, wherein a sectional area of said expansion member is larger than that of said notch.

11. A feed screw device comprising:
    a screw shaft;
    a nut member threadably engaging an outer periphery of the screw shaft;
    a lubricant supply device fixed to said nut member, said lubricant supply device coming in contact with the outer peripheral surface of said screw shaft and having a predetermined elasticity; and a deforming member which deforms at least an outer periphery of said lubricant supply device in the circumferential direction, wherein said nut member is provided with a recess portion for attaching said lubricant supply device and a retaining ring for retaining said lubricant supply device within said recess portion, and wherein said retaining ring is provided with a recess into which a part of said deforming member is inserted.

12. A feed screw device comprising:

a screw shaft;

a nut member threadably engaging an outer periphery of said screw shaft;

a lubricant supply device fixed to said nut member, said lubricant supply device coming in contact with the outer periphery of said screw shaft, said lubricant supply device having a predetermined elasticity; and a deforming member which deforms at least an outer periphery of said lubricant supply device in the circumferential direction, wherein said nut member is provided with a recess portion for attaching said lubricant supply device and a retaining ring for retaining said lubricant supply device within said recess portion, said retaining ring is provided with a recess into which a part of said deforming member is inserted, and wherein at least a portion of said lubricant supply device facing said screw shaft is made of rubber or synthetic resin containing a lubricant.

13. The feed screw device according to claim 12, wherein said lubricant supply device is ring shaped.

14. The feed screw device according to claim 12, wherein said lubricant supply device has an inner periphery surface, and wherein said deforming member presses the inner periphery of said lubricant supply device against the outer periphery of said screw shaft.

15. The feed screw device according to claim 12, wherein, said lubricant supply device has a cutting portion extending through said supply device from an inner periphery surface of said lubricant supply device to the outer periphery of said lubricant supply device.

16. The feed screw device according to claim 1, wherein said deforming member is disposed within said lubricant supply device in an area that is less than a full circumferential area of said lubricant supply device.

17. The feed screw device according to claim 1, wherein said cutting portion has opposing surfaces, which extend substantially parallel to an axial direction of said screw shaft.

* * * * *